United States Patent
Nam et al.

(10) Patent No.: US 12,446,047 B2
(45) Date of Patent: Oct. 14, 2025

(54) GRID-ALIGNED PHYSICAL DOWNLINK CONTROL CHANNEL SKIPPING FOR PERIODIC TRAFFIC

(71) Applicant: QUALCOMM Incorporated, San Diego, CA (US)

(72) Inventors: Wooseok Nam, San Diego, CA (US); Linhai He, San Diego, CA (US); Tao Luo, San Diego, CA (US); Olufunmilola Omolade Awoniyi-Oteri, San Diego, CA (US); Yuchul Kim, San Diego, CA (US); Peter Pui Lok Ang, San Diego, CA (US); Juan Montojo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 617 days.

(21) Appl. No.: 17/931,976

(22) Filed: Sep. 14, 2022

(65) Prior Publication Data
US 2023/0109608 A1    Apr. 6, 2023

Related U.S. Application Data

(60) Provisional application No. 63/262,004, filed on Oct. 1, 2021.

(51) Int. Cl.
*H04W 72/23*   (2023.01)
*H04W 52/02*   (2009.01)

(52) U.S. Cl.
CPC ....... *H04W 72/23* (2023.01); *H04W 52/0216* (2013.01); *H04W 52/0229* (2013.01)

(58) Field of Classification Search
CPC .......................... H04W 72/33; H04W 52/0216
USPC ......................................................... 370/329
See application file for complete search history.

(56) References Cited

U.S. PATENT DOCUMENTS

2011/0222491 A1* 9/2011 Vajapeyam ........... H04L 1/0038
370/329

* cited by examiner

*Primary Examiner* — Angel T Brockman
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration indicating a grid of traffic arrival times that includes a plurality of grids associated with respective time intervals. The UE may monitor a physical downlink control channel (PDCCH) during a first time interval associated with a first grid, of the plurality of grids. The UE may receive an indication to skip PDCCH monitoring based at least in part on monitoring the PDCCH during the first time interval. The UE may monitor the PDCCH during a second time interval associated with a second grid, of the plurality of grids. The UE may not monitor the PDCCH until a start of the second time interval based at least in part on the indication to skip the PDCCH monitoring. Numerous other aspects are described.

30 Claims, 12 Drawing Sheets

GRID-ALIGNED PHYSICAL DOWNLINK CONTROL CHANNEL SKIPPING FOR PERIODIC TRAFFIC

CROSS-REFERENCE TO RELATED APPLICATION

This patent application claims priority to U.S. Provisional Patent Application No. 63/262,004, filed on Oct. 1, 2021, titled "GRID-ALIGNED PHYSICAL DOWNLINK CONTROL CHANNEL SKIPPING FOR PERIODIC TRAFFIC," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for grid-aligned physical downlink control channel (PDCCH) skipping for periodic traffic.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration indicating a grid of traffic arrival times, wherein the grid of traffic arrival times includes a plurality of grids associated with respective time intervals. The method may include monitoring a physical downlink control channel (PDCCH) during a first time interval, of the respective time intervals, wherein the first time interval is associated with a first grid, of the plurality of grids. The method may include receiving an indication to skip PDCCH monitoring based at least in part on monitoring the PDCCH during the first time interval. The method may include monitoring the PDCCH during a second time interval, of the respective time intervals, wherein the second time interval is associated with a second grid, of the plurality of grids, and wherein the UE does not monitor the PDCCH until a start of the second time interval based at least in part on the indication to skip the PDCCH monitoring.

Some aspects described herein relate to a method of wireless communication performed by a base station. The method may include transmitting, to a UE, a configuration indicating a grid of traffic arrival times, wherein the grid of traffic arrival times includes a plurality of grids associated with respective time intervals, wherein the UE monitors a PDCCH during a first time interval, of the respective time intervals, based at least in part on the configuration, and wherein the first time interval is associated with a first grid, of the plurality of grids. The method may include transmitting, during the first time interval, an indication to skip PDCCH monitoring, wherein the UE monitors the PDCCH during a second time interval, of the respective time intervals, wherein the second time interval is associated with a second grid, of the plurality of grids, and wherein the UE does not monitor the PDCCH until a start of the second time interval based at least in part on the indication to skip the PDCCH monitoring.

Some aspects described herein relate to a UE for wireless communication. The user equipment may include a memory and one or more processors coupled to the memory. The one or more processors may be configured to receive a configuration indicating a grid of traffic arrival times, wherein the grid of traffic arrival times includes a plurality of grids associated with respective time intervals. The one or more processors may be configured to monitor a PDCCH during a first time interval, of the respective time intervals, wherein the first time interval is associated with a first grid, of the plurality of grids. The one or more processors may be configured to receive an indication to skip PDCCH monitoring based at least in part on monitoring the PDCCH during the first time interval. The one or more processors may be configured to monitor the PDCCH during a second time interval, of the respective time intervals, wherein the second time interval is associated with a second grid, of the plurality of grids, and wherein the UE does not monitor the PDCCH until a start of the second time interval based at least in part on the indication to skip the PDCCH monitoring.

Some aspects described herein relate to a base station for wireless communication. The base station may include a memory and one or more processors coupled to the memory. The one or more processors may be configured to transmit, to a UE, a configuration indicating a grid of traffic arrival times, wherein the grid of traffic arrival times includes a plurality of grids associated with respective time intervals, wherein the UE monitors a PDCCH during a first time interval, of the respective time intervals, based at least in part on the configuration, and wherein the first time interval is associated with a first grid, of the plurality of grids. The one or more processors may be configured to transmit, during the first time interval, an indication to skip PDCCH monitoring, wherein the UE monitors the PDCCH during a second time interval, of the respective time intervals, wherein the second time interval is associated with a second grid, of the plurality of grids, and wherein the UE does not monitor the PDCCH until a start of the second time interval based at least in part on the indication to skip the PDCCH monitoring.

Some aspects described herein relate to a non-transitory computer-readable medium that stores a set of instructions for wireless communication by a UE. The set of instructions, when executed by one or more processors of the UE, may cause the UE to receive a configuration indicating a grid of traffic arrival times, wherein the grid of traffic arrival times includes a plurality of grids associated with respective time intervals. The set of instructions, when executed by one or more processors of the UE, may cause the UE to monitor a PDCCH during a first time interval, of the respective time intervals, wherein the first time interval is associated with a first grid, of the plurality of grids. The set of instructions, when executed by one or more processors of the UE, may cause the UE to receive an indication to skip PDCCH monitoring based at least in part on monitoring the PDCCH during the first time interval. The set of instructions, when executed by one or more processors of the UE, may cause the UE to monitor the PDCCH during a second time interval, of the respective time intervals, wherein the second time interval is associated with a second grid, of the plurality of grids, and wherein the UE does not monitor the PDCCH until a start of the second time interval based at least in part on the indication to skip the PDCCH monitoring.

Some aspects described herein relate to a non-transitory computer-readable medium that stores a set of instructions for wireless communication by a base station. The set of instructions, when executed by one or more processors of the base station, may cause the base station to transmit, to a UE, a configuration indicating a grid of traffic arrival times, wherein the grid of traffic arrival times includes a plurality of grids associated with respective time intervals, wherein the UE monitors a PDCCH during a first time interval, of the respective time intervals, based at least in part on the configuration, and wherein the first time interval is associated with a first grid, of the plurality of grids. The set of instructions, when executed by one or more processors of the base station, may cause the base station to transmit, during the first time interval, an indication to skip PDCCH monitoring, wherein the UE monitors the PDCCH during a second time interval, of the respective time intervals, wherein the second time interval is associated with a second grid, of the plurality of grids, and wherein the UE does not monitor the PDCCH until a start of the second time interval based at least in part on the indication to skip the PDCCH monitoring.

Some aspects described herein relate to an apparatus for wireless communication. The apparatus may include means for receiving a configuration indicating a grid of traffic arrival times, wherein the grid of traffic arrival times includes a plurality of grids associated with respective time intervals. The apparatus may include means for monitoring a PDCCH during a first time interval, of the respective time intervals, wherein the first time interval is associated with a first grid, of the plurality of grids. The apparatus may include means for receiving an indication to skip PDCCH monitoring based at least in part on monitoring the PDCCH during the first time interval. The apparatus may include means for monitoring the PDCCH during a second time interval, of the respective time intervals, wherein the second time interval is associated with a second grid, of the plurality of grids, and wherein the UE does not monitor the PDCCH until a start of the second time interval based at least in part on the indication to skip the PDCCH monitoring.

Some aspects described herein relate to an apparatus for wireless communication. The apparatus may include means for transmitting, to a UE, a configuration indicating a grid of traffic arrival times, wherein the grid of traffic arrival times includes a plurality of grids associated with respective time intervals, wherein the UE monitors a PDCCH during a first time interval, of the respective time intervals, based at least in part on the configuration, and wherein the first time interval is associated with a first grid, of the plurality of grids. The apparatus may include means for transmitting, during the first time interval, an indication to skip PDCCH monitoring, wherein the UE monitors the PDCCH during a second time interval, of the respective time intervals, wherein the second time interval is associated with a second grid, of the plurality of grids, and wherein the UE does not monitor the PDCCH until a start of the second time interval based at least in part on the indication to skip the PDCCH monitoring.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
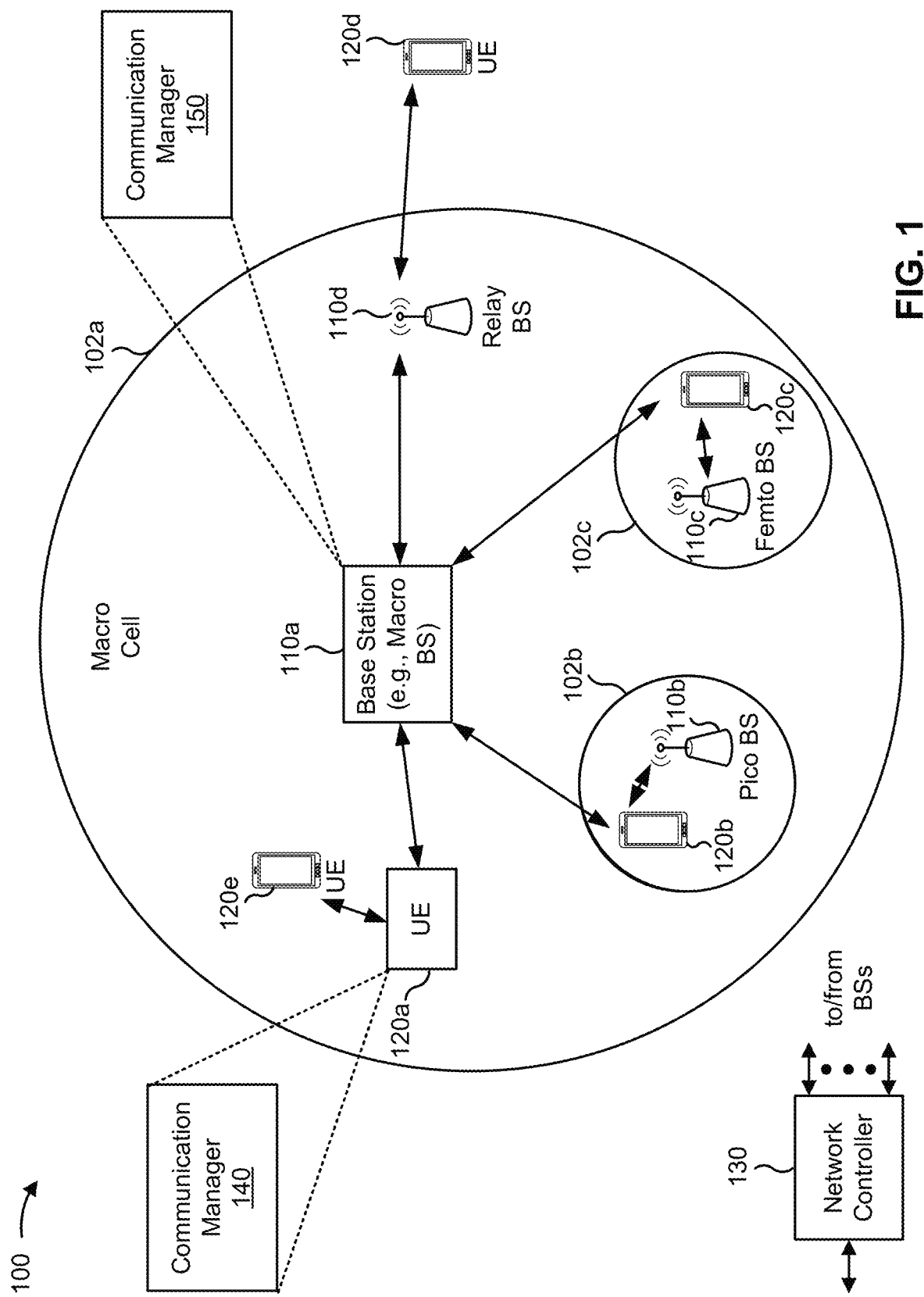
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with grid-aligned PDCCH skipping for periodic traffic. Additionally, or alternatively, the communication manager 140 may perform one or more other operations described herein.

In some aspects, the base station 110 may include a communication manager 150. As described in more detail elsewhere herein, the communication manager 150 may perform one or more operations associated with grid-aligned PDCCH skipping for periodic traffic. Additionally, or alternatively, the communication manager 150 may perform one or more other operations described herein.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As indicated above, FIG. 1 is provided as an example. Other examples may differ from what is described with regard to FIG. 1.

Figure 2:
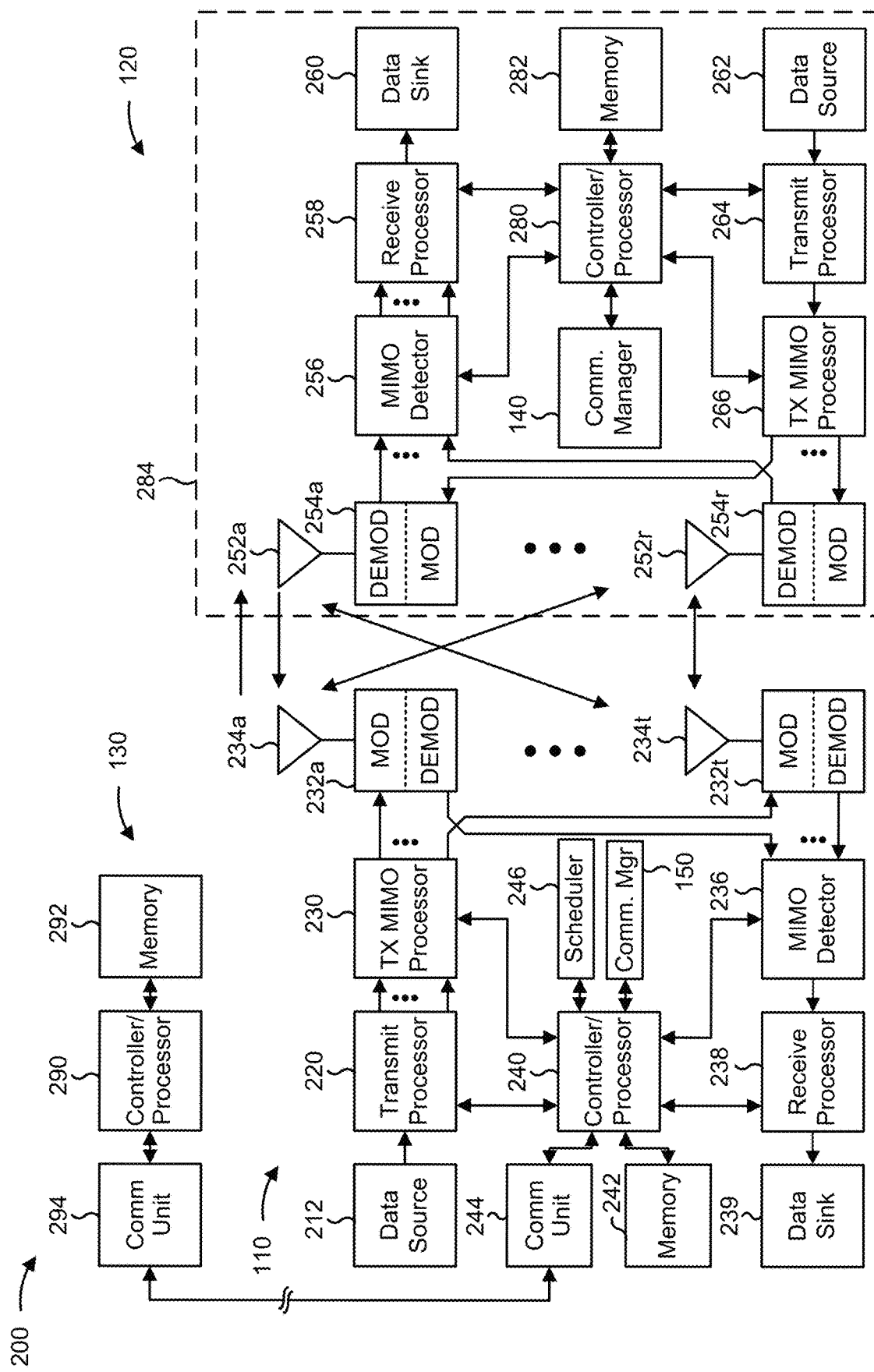
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-12).

The controller/processor 240 of the base station 110, the controller/processor 280 of the UE 120, and/or any other component(s) of FIG. 2 may perform one or more techniques associated with grid-aligned PDCCH skipping for periodic traffic, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for receiving a configuration indicating a grid of traffic arrival times, wherein the grid of traffic arrival times includes a plurality of grids associated with respective time intervals; means for monitoring a PDCCH during a first time interval, of the respective time intervals, wherein the first time interval is associated with a first grid, of the plurality of grids; means for receiving an indication to skip PDCCH monitoring based at least in part on monitoring the PDCCH during the first time interval; and/or means for monitoring the PDCCH during a second time interval, of the respective time intervals, wherein the first time interval is associated with a second grid, of the plurality of grids, and wherein the UE does not monitor the PDCCH until a start of the second time interval based at least in part on the indication to skip the PDCCH monitoring. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, a configuration indicating a grid of traffic arrival times, wherein the grid of traffic arrival times includes a plurality of grids associated with respective time intervals, wherein the UE monitors a PDCCH during a first time interval, of the respective time intervals, based at least in part on the configuration, and wherein the first time interval is associated with a first grid, of the plurality of grids; and/or means for transmitting, during the first time interval, an indication to skip PDCCH monitoring, wherein the UE monitors the PDCCH during a second time interval, of the respective time intervals, wherein the first time interval is associated with a second grid, of the plurality of grids, and wherein the UE does not monitor the PDCCH until a start of the second time interval based at least in part on the indication to skip the PDCCH monitoring. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
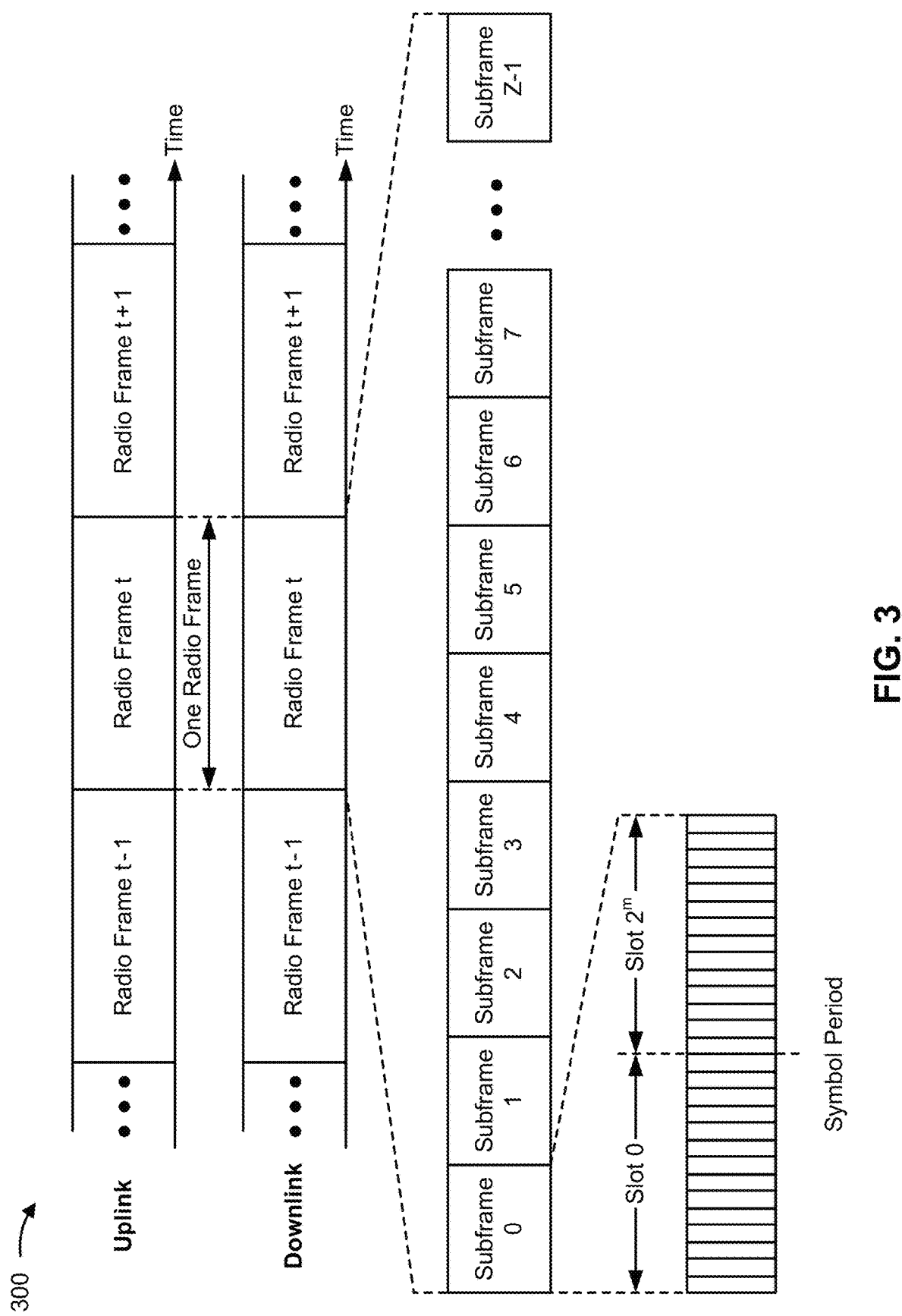
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is an index of a numerology used for a transmission, such as 0, 1, 2, 3, 4, or another number). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some cases, a scheduling unit for the FDD may be frame-based, subframe-based, slot-based, mini-slot based, or symbol-based.

As indicated above, FIG. 3 is provided as an example. Other examples may differ from what is described with respect to FIG. 3.

Figure 4:
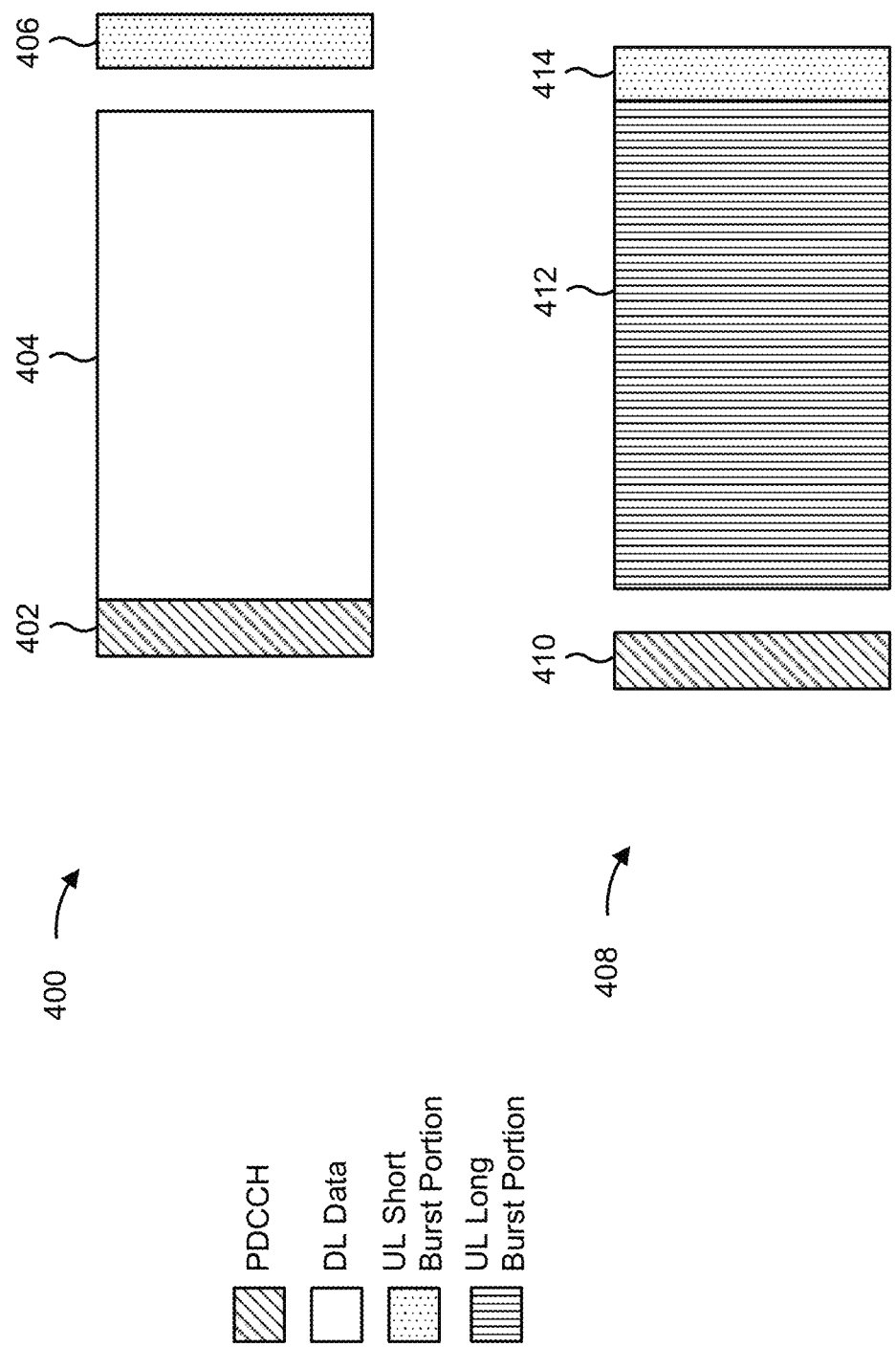
FIG. 4 is a diagram illustrating an example of a downlink (DL)-centric slot or communication structure and an uplink (UL)-centric slot or communication structure, in accordance with the present disclosure.

FIG. 4 is a diagram showing an example downlink (DL)-centric slot or communication structure 400 and an uplink (UL)-centric slot or communication structure 408, in accordance with of the present disclosure. The DL-centric slot (or wireless communication structure) 400 may include a control portion 402 during which the scheduling entity (for example, a base station 110) transmits various scheduling information or control information corresponding to various portions of the DL-centric slot 400 to the subordinate entity (for example, a UE 120). The control portion 402 may exist in the initial or beginning portion of the DL-centric slot 400. In some configurations, the control portion 402 may be a PDCCH, as indicated in FIG. 4. In some aspects, the control portion 402 may include legacy PDCCH information, shortened PDCCH (sPDCCH) information, a control format indicator (CFI) value (for example, carried on a physical control format indicator channel (PCFICH)), one or more grants (for example, downlink grants, or uplink grants), among other examples, or combinations thereof.

The DL-centric slot 400 may also include a DL data portion 404 during which the scheduling entity (for example, the base station 110) transmits DL data to the subordinate entity (for example, the UE 120) using communication resources utilized to communicate DL data. The DL data portion 404 may sometimes be referred to as the payload of the DL-centric slot 400. In some configurations, the DL data portion 404 may be a physical downlink shared channel (PDSCH).

The DL-centric slot 400 may also include an UL short burst portion 406 during which the subordinate entity (for example, the UE 120) transmits reference signals or feedback to the scheduling entity (for example, the base station 110) using communication resources utilized to communicate UL data. The UL short burst portion 406 may sometimes be referred to as a UL burst, a UL burst portion, a common UL burst, a short burst, a UL short burst, a common UL short burst, a common UL short burst portion, or various other suitable terms. In some aspects, the UL short burst portion 406 may include one or more reference signals. Additionally, or alternatively, the UL short burst portion 406 may include feedback information corresponding to various other portions of the DL-centric slot 400. For example, the UL short burst portion 406 may include feedback information corresponding to the control portion 402 or the DL data portion 404. Non-limiting examples of information that may be included in the UL short burst portion 406 include an acknowledgement (ACK) signal (for example, a physical uplink control channel (PUCCH) ACK, a physical uplink shared channel (PUSCH) ACK, or an immediate ACK), a negative acknowledgement (NACK) signal (for example, a PUCCH NACK, a PUSCH NACK, or an immediate NACK), a scheduling request (SR), a buffer status report (BSR), a hybrid automatic repeat request (HARD) indicator, a channel state indication (CSI), a CQI, a sounding reference signal (SRS), a DMRS, PUSCH data, or various other suitable types of information. The UL short burst portion 406 may include additional or alternative information, such as information pertaining to random access channel (RACH) procedures, scheduling requests, and various other suitable types of information.

As illustrated in FIG. 4, the end of the DL data portion 404 may be separated in time from the beginning of the UL short burst portion 406. This time separation may sometimes be referred to as a gap, a guard period, a guard interval, or various other suitable terms. This separation provides time for the switch-over from DL communication (for example, reception operation by the subordinate entity (for example, the UE 120)) to UL communication (for example, transmission by the subordinate entity (for example, the UE 120)). The foregoing provides some examples of a DL-centric wireless communication structure, but alternative structures having similar features may exist without deviating from the aspects described herein.

The UL-centric slot (or wireless communication structure) 408 may include a control portion 410. The control portion 410 may exist in the initial or beginning portion of the UL-centric slot 408. The control portion 410 in may be similar to the control portion 402 described above with reference to the DL-centric slot 400. The UL-centric slot 408 may also include an UL long burst portion 412. The UL long burst portion 412 may sometimes be referred to as the payload of the UL-centric slot 408. "The UL portion" may refer to the communication resources utilized to communicate UL data from the subordinate entity (for example, the UE 120) to the scheduling entity (for example, the base station 110). In some configurations, the control portion 410 may be a PDCCH.

As illustrated, the end of the control portion 410 may be separated in time from the beginning of the UL long burst portion 412. This time separation may sometimes be referred to as a gap, guard period, guard interval, or various other suitable terms. This separation provides time for the switchover from DL communication (for example, reception operation by the scheduling entity (for example, the base station 110)) to UL communication (for example, transmission operation by the scheduling entity (for example, the base station 110)).

The UL-centric slot 408 may also include an UL short burst portion 414. The UL short burst portion 414 may be similar to the UL short burst portion 406 described elsewhere herein with reference to the DL-centric slot 400, and may include any of the information described elsewhere herein with reference to the DL-centric slot 400. The foregoing is merely one example of an UL-centric wireless communication structure, and alternative structures having similar features may exist without deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided as an example. Other examples may differ from what is provided with regard to FIG. 4.

Figure 5:
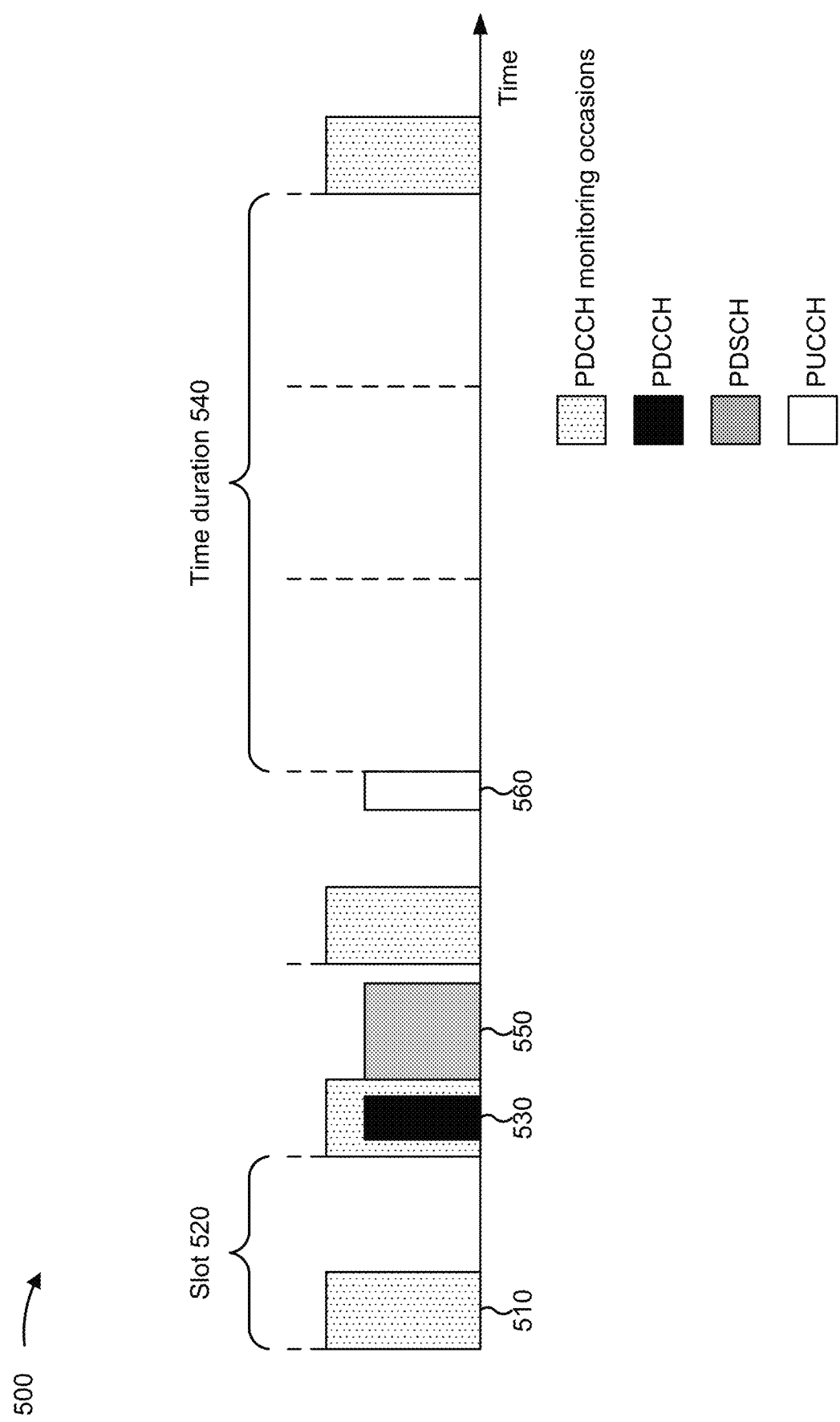
FIG. 5 is a diagram illustrating an example of monitoring a control channel, in accordance with the present disclosure.

FIG. 5 is a diagram illustrating an example 500 of monitoring of a control channel, in accordance with the present disclosure. In accordance with FIG. 5, a UE (e.g., UE 120) may monitor for control information (e.g., control information transmitted by a base station 110) at fixed PDCCH monitoring occasions 510 that may occur in each slot 520. For example, the UE may attempt to decode a PDCCH in each PDCCH monitoring occasion 510. In some cases, the UE may successfully decode a PDCCH 530 in a PDCCH monitoring occasion 510. The decoded PDCCH 530 may carry control information (e.g., downlink control information (DCI)) that is intended for the UE. For example, the PDCCH 530 may carry control information (e.g., scheduling information) that schedules a downlink transmission from a base station (e.g., a base station 110) or an uplink transmission of the UE. In some cases, the UE may successfully decode the PDCCH 530 during an active period of a discontinuous reception (DRX) operation of the UE or during a continuous reception operation of the UE (e.g., when the UE is not configured for DRX).

In some cases, the control information may provide an indication that the UE is to skip monitoring (e.g., refrain from monitoring) PDCCHs (e.g., skip one or more PDCCH monitoring occasions 510) for a particular time duration 540 (e.g., a skip duration). For example, the control information (e.g., DCI) may include a 2-bit indication field that indicates the time duration 540 for which the UE is to skip monitoring PDCCHs. In some cases, the time duration 540 may be one or more transmission time intervals (TTIs) (e.g., one or more slots, mini-slots, subframes, and/or the like). In some cases, the UE may be configured with a set of time durations, and the control information may identify the time duration 540 from the set of time durations.

In some cases, the base station may determine the time duration 540 for which the UE is to skip monitoring PDCCHs. The base station may determine the time duration 540 based at least in part on a quantity of UEs for which the base station is to provide control information. For example, the base station may determine the time duration 540 based at least in part on a quantity of UEs having data in a scheduling buffer of the base station or a quantity of data for transmissions in a scheduling buffer of the base station, among other examples. Accordingly, the base station may transmit, and the UE may receive, in PDCCH 530, control information that provides an indication that the UE is to skip monitoring PDCCHs for the time duration 540.

The UE may receive, in a PDSCH 550, a downlink transmission from the base station as scheduled by the control information. The UE may transmit ACK or NACK feedback for the downlink transmission to the base station in a PUCCH 560 (e.g., as scheduled by the control information). In some cases, the control information may schedule (e.g., provide an uplink grant) an uplink transmission from the UE to the base station in a PUSCH (not shown in FIG. 5).

In some cases, the UE may monitor PDCCHs according to the indication to skip monitoring PDCCHs of the control information (and the base station may transmit further control information in a PDCCH according to the indication to skip monitoring PDCCHs). In some cases, the UE may skip monitoring PDCCHs (e.g., skip monitoring one or more PDCCH monitoring occasions 510) for the time duration 540 indicated by the control information and starting from a particular starting point (e.g., a configured starting point or a starting point identified by the control information). For example, the UE may skip monitoring PDCCHs, for the time duration 540, starting from a next time period (e.g., symbol, slot, subframe, frame, or TTI) after the control information is received (e.g., starting from a next symbol after receiving PDCCH 530), a next time period after a control region (e.g., a control resource set (CORESET)) in which the control information is received (e.g., starting from a next symbol after a PDCCH monitoring occasion 510 in which PDCCH 530 is received), a next time period after receiving the downlink transmission scheduled by the control information (e.g., starting from a next symbol after receiving PDSCH 550), a next time period (e.g., symbol, slot, subframe, frame, TTI, and/or the like) after transmitting the uplink transmission (e.g., in a PUSCH) scheduled by the control information (e.g., starting from a next symbol after transmitting in the PUSCH), a next time period after a time offset (e.g., a configured time offset or a time offset identified by the control information) that follows transmitting the uplink transmission (e.g., in a PUSCH) scheduled by the control information, or a next time period after transmitting ACK or NACK feedback (e.g., HARQ feedback) for the downlink transmission.

As indicated above, FIG. 5 is provided as an example. Other examples may differ from what is described with respect to FIG. 5.

In some cases, a UE may be in a PDCCH monitoring only operational state. The UE may monitor the PDCCH (e.g., blind decoding of PDCCH candidates) but may not decode any actual scheduling grant transmitted in the PDCCH for the UE. In some cases, power consumption by the UE in the PDCCH monitoring only operational state may be a significant portion of the UE's total power profile.

In some cases, to enable the UE to conserve power, a base station may transmit, to the UE, an indication to skip monitoring one or more PDCCH monitoring occasions for a time duration, as described elsewhere herein. For example, the base station may determine that the UE is to receive periodic traffic. The base station may transmit control information (e.g., DCI) that includes an indication that the UE is to skip monitoring (e.g., refrain from monitoring) PDCCHs (e.g., skip one or more PDCCH monitoring occasions) for a particular time duration (e.g., a skip duration). The time duration may correspond to an inter-burst gap between transmissions of the periodic traffic. The inter-burst gap may correspond to a time duration defined by an end of one transmission and a start of the next transmission.

The control information may include a 2-bit indication field that indicates the time duration for which the UE is to skip monitoring PDCCHs. In some cases, the UE may be configured with a set of time durations, and a value of the 2-bit indication field may indicate the time duration from the set of time durations. Because the indication field includes 2 bits, a maximum of four different time durations may be indicated by the value of the indication field.

In some cases, periodic traffic may have a variable burst size. For example, for traffic associated with an augmented reality (AR) or an extended reality (XR) application, the arrival of traffic at the UE may be substantially periodic. For example, for traffic corresponding to a video stream captured at sixty frames per second (fps), a new burst may arrive at the UE every 16.7 milliseconds.

In some cases, to enable the UE to conserve power, a base station may transmit, to the UE, an indication to skip monitoring one or more PDCCH monitoring occasions for a time duration. For example, the base station may transmit control information (e.g., DCI) that includes an indication that the UE is to skip monitoring PDCCHs for a particular time duration (e.g., a skip duration). The time duration may correspond to an inter-burst gap between transmissions of the traffic associated with the AR or XR application.

The bursts of traffic may be served by a media access control (MAC) layer or a physical (PHY) layer of the UE (e.g., by PDCCH and PDSCH transmissions). Although the arrival of the bursts of traffic may be periodic, the inter-burst gap between a last PDCCH for a burst of traffic and the first PDCCH of the next burst of traffic may be random (e.g., between 0 ms and 16 ms).

Further, due to traffic jitter, there may be small perturbation or drift in the traffic arrival rate. The small perturbation or drift in the traffic arrival rate may cause the arrival time of the traffic to slightly vary over time.

Further, the size of each burst may vary over time. For example, a size of a burst containing data corresponding to an I-frame of video may be larger than a size of a burst containing only data corresponding to one or more P-frames of video. Due to the variable size of the bursts, the number of data channels (e.g., PDSCHs) or slots for serving a burst may vary. Due to the scheduling uncertainty caused by the slight variations in the arrival time of the traffic and variations in the number of data channels or slots for serving a burst, an amount of time associated with the MAC layer or the PHY layer serving a burst may vary.

To achieve higher power saving gains associated with periodic traffic having variable burst sizes, the indication of the time interval for skipping PDCCH monitoring should indicate a wide range of time intervals. However, because the indication field includes 2 bits, a maximum of four different time durations may be indicated by the value of the indication field. To increase the quantity of time durations that may be indicated, the size of the indication field may be increased. For example, log N bits are required to indicate N different time durations. However, increasing the size of the indication field may result in larger signaling overhead.

Some techniques and apparatuses described herein enable a PDCCH skipping scheme with a low signaling overhead and that is suitable for periodic traffic having variable burst sizes, variations in the arrival time of the traffic, and variations in the amount of time associated with the MAC layer or the PHY layer serving a burst of the traffic.

Figure 6:
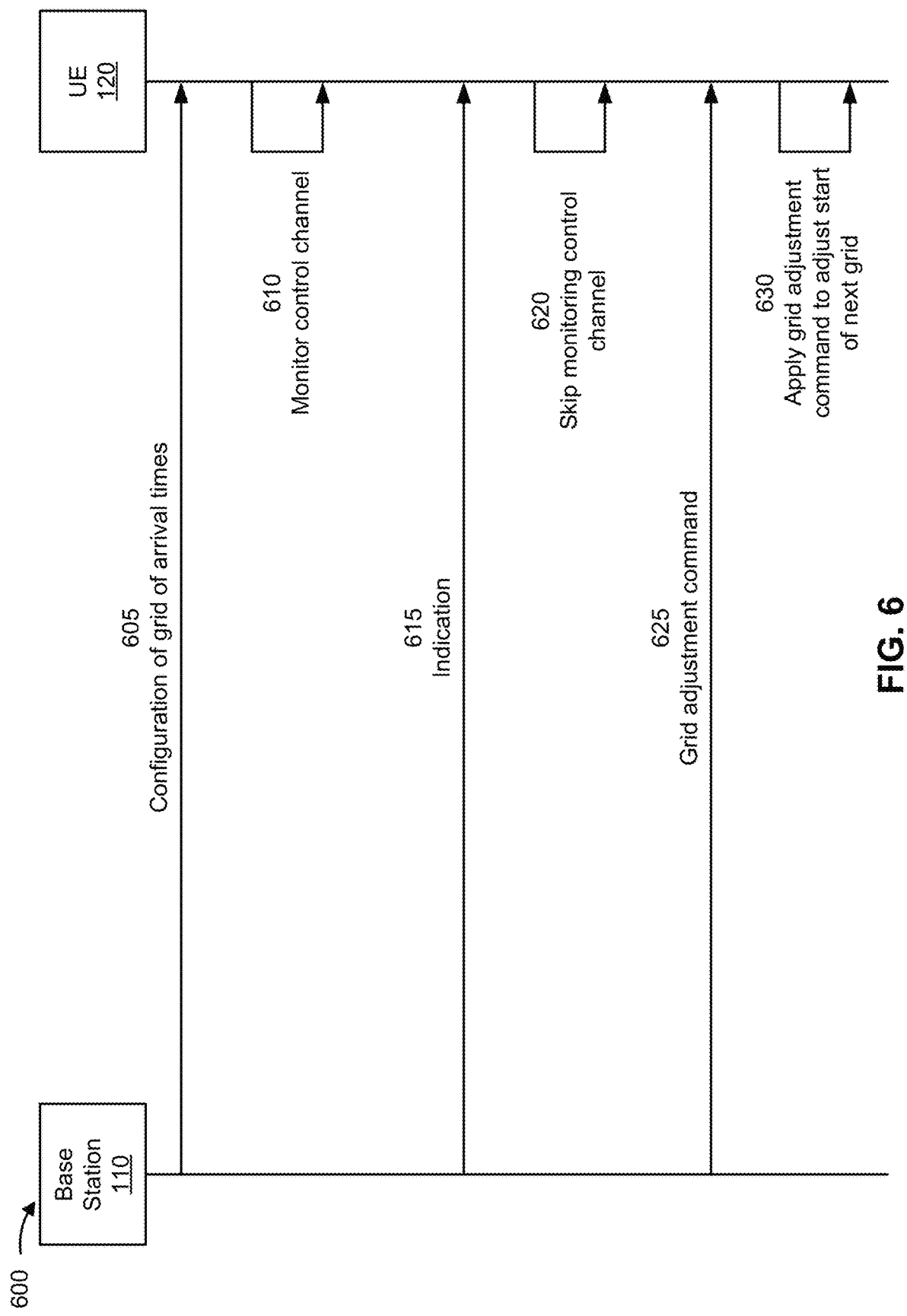
FIGS. 6-8 are diagrams illustrating examples associated with grid-aligned physical downlink control channel (PDCCH) skipping for periodic traffic, in accordance with the present disclosure.
Figure 7:
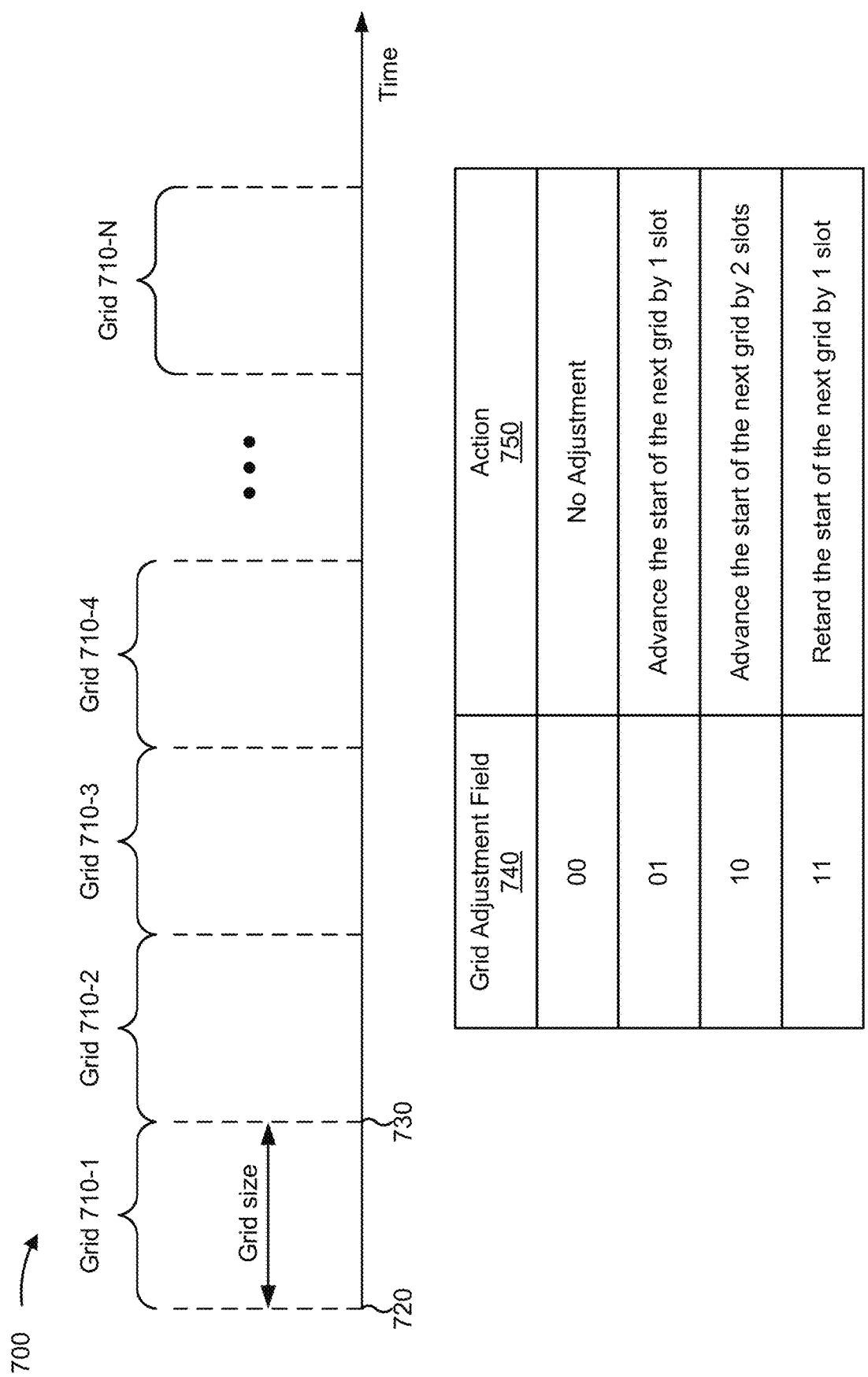

FIGS. 6 and 7 are diagrams illustrating examples 600 and 700 associated with grid-aligned PDCCH skipping for periodic traffic, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown by reference number 605, the base station 110 may transmit, and the UE 120 may receive, a configuration of a grid of arrival times. In some aspects, the configuration is received via radio resource control (RRC) signaling. In some aspects, the configuration is received via DCI. In some aspects, the configuration is received via a MAC control element (MAC-CE).

In some aspects, the configuration may indicate a grid size of a plurality of grids (e.g., grids 710-1 through 710-N, as shown in FIG. 7) included in a grid of arrival times. The grid size may correspond to a nominal distance between the starting points of two adjacent grids of the plurality of grids. The distance between the starting points of two adjacent grids may correspond to time intervals associated with traffic arriving at the UE 120. The grid size may be defined in units of slots or in absolute time duration (e.g., a quantity of milliseconds), among other examples.

In some aspects, the configuration may indicate a starting offset of a first grid of the plurality of grids. For example, the configuration may indicate a slot index k associated with a slot, wherein k is the indicated starting offset. The first grid of the plurality of grids may start at the slot k based at least in part on the starting offset. Similarly, a second grid, of the plurality of grids, may start at a slot associated with the slot index k+m (where m is the grid size of the plurality of grids), a third grid, of the plurality of grids, may start at a slot associated with the slot index k+2m, and a fourth grid, of the plurality of grids, may start at a slot associated with the slot index k+3m.

The plurality of grids may be associated with respective time intervals associated with an inter-arrival time of traffic at the UE 120. As shown in FIG. 7, with respect to grid 710-1, a start 720 of the grid 710-1 may correspond to a time at which a burst of traffic is predicted to arrive at the UE 120. The burst of traffic may be predicted to arrive at the UE 120 based at least in part on an inter-arrival time of the traffic. The inter-arrival time of the traffic may be determined based at least in part on a traffic model associated with a type (e.g., XR traffic, AR traffic, virtual reality (VR) traffic, or video traffic, among other examples) of the traffic.

For example, the base station 110 may determine that traffic transmitted to the UE 120 is video traffic with sixty frames per second. The traffic model associated with the video traffic may indicate an inter-arrival time of bursts of traffic occurring every 16.7 ms based at least in part on the video traffic having sixty frames per second. The configuration may indicate that a grid size of the plurality of grids (e.g., a distance between the start 720 of the grid 710-1 and the start 730 of the grid 710-2) is 16.7 ms based at least in part on the traffic model indicating that the inter-arrival time of bursts of traffic occurs every 16.7 ms.

As another example, the base station 110 may determine that traffic transmitted to the UE 120 is file transfer protocol (FTP) traffic with an arrival rate of λ based at least in part on a traffic model associated with FTP traffic. The configuration may indicate that a grid size of the plurality of grids is 1/λ based at least in part on the traffic model indicating that the FTP traffic has an arrival rate of λ.

In some aspects, the base station 110 may determine the grid size based at least in part on a MAC parameter and/or a PHY parameter associated with the UE 120. For example, the grid size may be an integer multiple of a PDCCH monitoring periodicity associated with the UE 120. As another example, when DRX is configured for the UE 120, the base station 110 may determine the grid size to align with the DRX cycle.

In some aspects, the UE 120 may indicate a preferred grid size to the base station 110. For example, the UE 120 may indicate a preferred grid size via UE information feedback transmitted to the base station 110. The base station 110 may determine the grid size for the plurality of grids based at least in part on the preferred grid size indicated by the UE 120.

As shown in FIG. 6, and by reference number 610, the UE 120 may monitor the control channel. The UE 120 may monitor for control information (e.g., control information transmitted by the base station 110) at fixed PDCCH monitoring occasions that may occur in each slot. For example, the UE may attempt to decode a PDCCH in each PDCCH monitoring occasion. In some cases, the UE may successfully decode a PDCCH in a PDCCH monitoring occasion. The decoded PDCCH may carry control information (e.g., DCI) that is intended for the UE. For example, the PDCCH may carry control information (e.g., scheduling information) that schedules a downlink transmission from the base station 110 or an uplink transmission of the UE. In some aspects, the UE may successfully decode the PDCCH during an active period of a DRX operation of the UE or during a continuous reception operation of the UE (e.g., when the UE is not configured for DRX).

As shown by reference number 615, the base station 110 may transmit, and the UE 120 may receive, an indication to skip PDCCH monitoring based at least in part on the configuration of the grid arrival times. The UE 120 may receive the indication to skip PDCCH monitoring via DCI or a MAC-CE. In some aspects, the indication to skip PDCCH monitoring is included in a one-bit field of DCI. The one-bit field may be set to a first value (e.g., 1) to indicate that the UE 120 is to skip PDCCH monitoring. The one-bit field may be set to a second value (e.g., 0) to indicate that the UE 120 is not to skip PDCCH monitoring or, if the UE 120 is currently skipping PDCCH monitoring, that the UE 120 is to resume PDCCH monitoring.

As shown by reference number 620, the UE 120 may skip monitoring the PDCCH for a time interval corresponding to a start of a next grid of the plurality of grids based at least in part on the indication. As an example, the UE 120 may perform PDCCH monitoring during a first time interval corresponding to a first grid (e.g., grid 710-1 in FIG. 7). The UE 120 may receive the indication during the first time interval and may skip PDCCH monitoring for a remaining time of the first time interval (e.g., until the start 730 of the grid 710-2) based at least in part on the indication.

In some aspects, as shown by reference number 625, the UE 120 may receive a grid adjustment command. The grid adjustment command may indicate an adjustment or change to a start of the next grid (e.g., the start 730 of the grid 710-2). In some aspects, the grid adjustment command may indicate a unit of adjustment (e.g., a quantity of slots or an amount of time) and a direction (e.g., advance in time or retard in time) of adjustment.

In some aspects, as shown in FIG. 7, the grid adjustment command may include a grid adjustment field 740. In some aspects, the grid adjustment field 740 may include a 2-bit field. A value of the grid adjustment field may indicate an action 750 (e.g., a unit of adjustment and a direction) associated with adjusting or changing the start of the next grid.

For example, the grid adjustment field may include a first value (00, as shown in FIG. 7) to indicate a first action (e.g., no adjustment to the start of the next grid, as shown in FIG. 7). The grid adjustment field may include a second value (01, as shown in FIG. 7) to indicate a second action (e.g., advance the start of the next grid by 1 slot, as shown in FIG. 7). The grid adjustment field may include a third value (10, as shown in FIG. 7) to indicate a third action (e.g., advance the start of the next grid by 2 slots, as shown in FIG. 7). The grid adjustment field may include a fourth value (11, as shown in FIG. 7) to indicate a fourth action (e.g., retard the start of the next grid by 1 slot, as shown in FIG. 7).

As shown by reference number 630, the UE 120 may apply the grid adjustment command to adjust the start of a next grid based at least in part on an action indicated in the grid adjustment command. In some aspects, the UE 120 may apply the grid adjustment command to only the start of the next grid. For example, the configuration, the indication, the DCI, or the MAC-CE may indicate that a grid adjustment command is to be applied to the start of only the next grid to account for jitter associated with a next burst of traffic.

In some aspects, the UE 120 may apply the grid adjustment command to the start of each subsequent grid. For example, the configuration, the indication, the DCI, or the MAC-CE may indicate that a grid adjustment command is to be applied to the start of each subsequent grid to account for drift associated with the traffic.

In some aspects, the UE 120 may receive multiple grid adjustment commands. In some aspects, the UE 120 may determine that the multiple grid adjustment commands are to be applied additively. For example, the configuration may indicate that the multiple grid adjustment commands are to be applied additively to a start of a next grid to account for traffic jitter associated with a next burst of traffic. Applying the grid commands additively to the start of the next grid may enable a wider range of adjustments to the start of the next grid without increasing a size of the grid adjustment command.

In some aspects, the UE 120 may receive multiple grid adjustment commands during a same time interval. The UE 120 may apply the most recently received grid adjustment command to the start of the next grid. In some aspects, the configuration may indicate a set of criteria for determining which grid adjustment command to apply to the start of the next grid when multiple grid adjustment commands are received during a same time interval. For example, the configuration may indicate that a first, a second, or a last (e.g., a most recently received) grid adjustment command is to be applied to the start of the next grid when multiple grid commands are received during a same time interval.

In some aspects, the multiple grid adjustment commands may be the same grid adjustment command. For example, the base station 110 may transmit the same grid adjustment command to the UE 120 to ensure that the UE 120 receives the grid adjustment command or to enable the UE 120 to verify the grid adjustment command based at least in part on determining that the multiple grid adjustment commands are the same. By providing multiple grid adjustment commands indicating the same adjustment command, a reliability associated with the UE 120 adjusting the start of the next grid may be increased.

In some aspects, the UE 120 may receive an indication of a second mode of PDCCH monitoring. The second mode of PDCCH monitoring may be associated with skipping monitoring the PDCCH for a pre-configured duration of time (rather than a first mode of PDCCH monitoring associated with skipping monitoring the PDCCH until the start of the next grid).

In some aspects, the indication of the second mode of PDCCH monitoring may be included in DCI or a MAC-CE. In some aspects, the DCI includes a first field associated with indicating the first mode of PDCCH monitoring associated with skipping monitoring the PDCCH until the start of the next grid and a second field associated with the second mode of PDCCH monitoring associated with skipping monitoring the PDCCH for a pre-configured duration of time. In some aspects, the first field is a one bit field and the second field is a two bit field.

In some aspects, the DCI includes a single field indicating the mode of PDCCH monitoring. Different modes of PDCCH monitoring may be mapped to different values or DCI codepoints indicated by a value of the field. For example, a first value or DCI codepoint (e.g., 00) may indicate the first mode of PDCCH monitoring associated with skipping monitoring the PDCCH until the start of the next grid. A second value or DCI codepoint (e.g., 01) may indicate the second mode of PDCCH monitoring associated with skipping monitoring the PDCCH for a first duration of time. A third value or DCI codepoint (e.g., 10) may indicate the second mode of PDCCH monitoring associated with skipping monitoring the PDCCH for a second duration of time. A fourth value or DCI codepoint (e.g., 11) may indicate the second mode of PDCCH monitoring associated with skipping monitoring the PDCCH for a third duration of time.

As indicated above, FIGS. 6 and 7 are provided as an example. Other examples may differ from what is described with respect to FIGS. 6 and 7.

Figure 8:
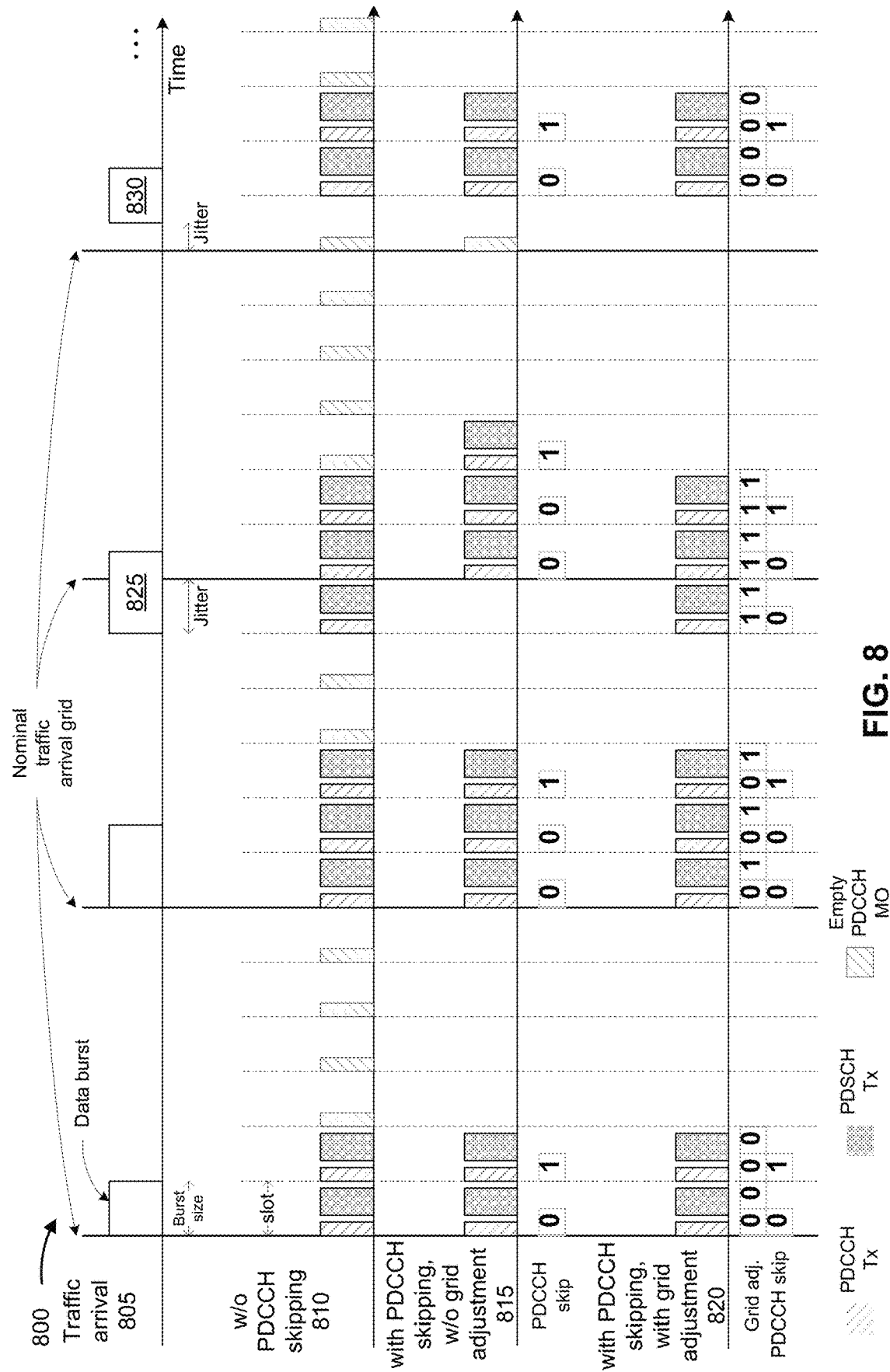

FIG. 8 is a diagram illustrating example 800 associated with grid-aligned PDCCH skipping for periodic traffic, in accordance with the present disclosure. As shown in FIG. 8, example 800 includes a timeline 805 indicating an arrival of bursts of traffic, a timeline 810 of performing PDCCH monitoring without skipping, a timeline 815 of performing PDCCH monitoring with skipping and without grid adjustment, and a timeline 820 of performing PDCCH monitoring with skipping and with grid adjustment.

As shown by timeline 810, the UE 120 may monitor for control information at fixed PDCCH monitoring occasions that may occur in each slot. For example, the UE 120 may attempt to decode a PDCCH in each PDCCH monitoring occasion. In some aspects, the UE 120 may successfully decode a PDCCH in a PDCCH monitoring occasion. The decoded PDCCH may carry control information (e.g., DCI) that is intended for the UE 120. For example, the PDCCH may carry control information (e.g., scheduling information) that schedules a downlink transmission from a base station 110 or an uplink transmission of the UE 120. In some aspects, the monitoring occasion may correspond to an empty PDCCH monitoring occasion due to the PDCCH not carrying control information that is intended for the UE 120.

As shown by timeline 815, the UE 120 may perform PDCCH skipping without grid adjustment and may reduce the quantity of empty PDCCH monitoring occasions with respect to timeline 810. However, the UE 120 may not be able to account for variations in the arrival time of data burst 825 or data burst 830 resulting from traffic jitter.

As shown by timeline 820, the UE 120 may perform PDCCH skipping with grid adjustment and may reduce the quantity of empty PDCCH monitoring occasions with respect to timeline 810. Additionally, the UE 120 may dynamically adjust the start of a next grid based at least in part on a grid adjustment command received from the base station 110, which may enable the UE 120 to account for variations in the arrival time of data burst 825 or data burst 830 resulting from traffic jitter.

As indicated above, FIG. 8 is provided as an example. Other examples may differ from what is described with respect to FIG. 8.

Figure 9:
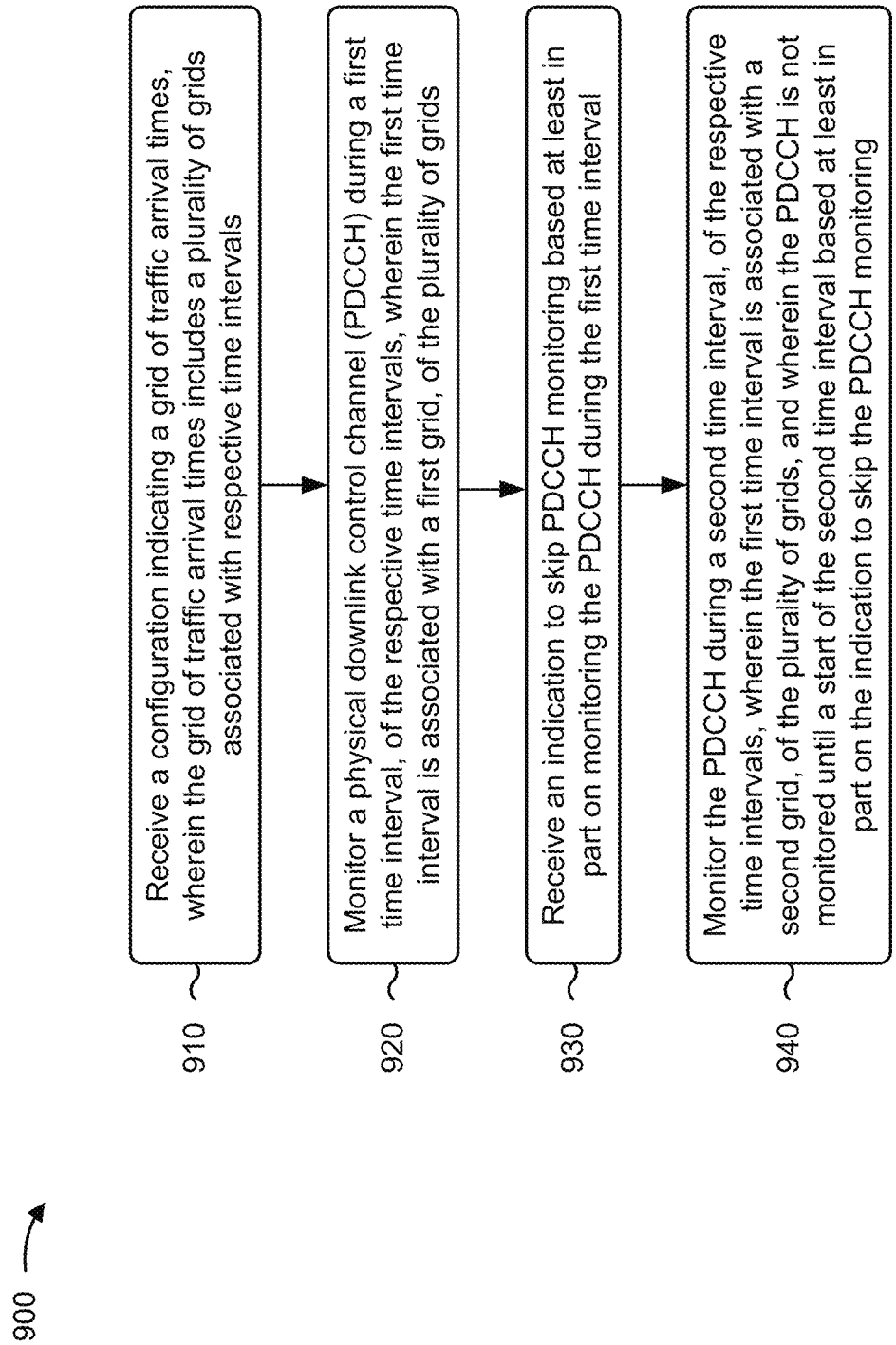
FIGS. 9 and 10 are diagrams illustrating example processes associated with grid-aligned PDCCH skipping for periodic traffic, in accordance with the present disclosure.

FIG. 9 is a diagram illustrating an example process 900 performed, for example, by a UE, in accordance with the present disclosure. Example process 900 is an example where the UE (e.g., UE 120) performs operations associated with grid-aligned PDCCH skipping for periodic traffic.

As shown in FIG. 9, in some aspects, process 900 may include receiving a configuration indicating a grid of traffic arrival times, wherein the grid of traffic arrival times includes a plurality of grids associated with respective time intervals (block 910). For example, the UE (e.g., using communication manager 140 and/or reception component 1102, depicted in FIG. 11) may receive a configuration indicating a grid of traffic arrival times, wherein the grid of traffic arrival times includes a plurality of grids associated with respective time intervals, as described above.

As further shown in FIG. 9, in some aspects, process 900 may include monitoring a PDCCH during a first time interval, of the respective time intervals, wherein the first time interval is associated with a first grid, of the plurality of grids (block 920). For example, the UE (e.g., using communication manager 140 and/or monitoring component 1108, depicted in FIG. 11) may monitor a PDCCH during a first time interval, of the respective time intervals, wherein the first time interval is associated with a first grid, of the plurality of grids, as described above.

As further shown in FIG. 9, in some aspects, process 900 may include receiving an indication to skip PDCCH monitoring based at least in part on monitoring the PDCCH during the first time interval (block 930). For example, the UE (e.g., using communication manager 140 and/or reception component 1102, depicted in FIG. 11) may receive an indication to skip PDCCH monitoring based at least in part on monitoring the PDCCH during the first time interval, as described above.

As further shown in FIG. 9, in some aspects, process 900 may include monitoring the PDCCH during a second time interval, of the respective time intervals, wherein the first time interval is associated with a second grid, of the plurality of grids, and wherein the PDCCH is not monitored until a start of the second time interval based at least in part on the indication to skip the PDCCH monitoring (block 940). For example, the UE (e.g., using communication manager 140 and/or monitoring component 1108, depicted in FIG. 11) may monitor the PDCCH during a second time interval, of the respective time intervals, wherein the first time interval is associated with a second grid, of the plurality of grids, and wherein the PDCCH is not monitored until a start of the second time interval based at least in part on the indication to skip the PDCCH monitoring, as described above.

Process 900 may include additional aspects, such as any single aspect or any combination of aspects described below and/or in connection with one or more other processes described elsewhere herein.

In a first aspect, the configuration is associated with a traffic model for a particular type of traffic.

In a second aspect, alone or in combination with the first aspect, the particular type of traffic corresponds to video traffic, FTP traffic, AR traffic, XR traffic, or VR traffic.

In a third aspect, alone or in combination with one or more of the first and second aspects, a grid size of the plurality of grids is based at least in part on an inter-arrival time of traffic communicated via a PDSCH.

In a fourth aspect, alone or in combination with one or more of the first through third aspects, a grid size of the plurality of grids is based at least in part on one or more of a MAC parameter or a parameter associated with a PHY layer of the UE.

In a fifth aspect, alone or in combination with one or more of the first through fourth aspects, a distance between a start of the first grid and a start of the second grid, within the grid of traffic arrival times, is an integer multiple of a PDCCH monitoring periodicity.

In a sixth aspect, alone or in combination with one or more of the first through fifth aspects, a distance between a start of the first grid and a start of the second grid, within the grid of traffic arrival times, is aligned with a DRX cycle.

In a seventh aspect, alone or in combination with one or more of the first through sixth aspects, process 900 includes receiving, via RRC signaling, an indication of a grid size of the plurality of grids.

In an eighth aspect, alone or in combination with one or more of the first through seventh aspects, a grid size of the plurality of grids is defined in units of slots or in absolute time duration.

In a ninth aspect, alone or in combination with one or more of the first through eighth aspects, process 900 includes transmitting an indication of a grid size of the plurality of grids.

In a tenth aspect, alone or in combination with one or more of the first through ninth aspects, the indication to skip the PDCCH monitoring is received via DCI or a MAC-CE.

In an eleventh aspect, alone or in combination with one or more of the first through tenth aspects, the indication to skip the PDCCH monitoring is included in a one-bit field of DCI.

In a twelfth aspect, alone or in combination with one or more of the first through eleventh aspects, process 900 includes receiving, during the first time interval, a grid adjustment command, and modifying the start of the second time interval based at least in part on the grid adjustment command, wherein the PDCCH is monitored based at least in part on modifying the start of the second time interval.

In a thirteenth aspect, alone or in combination with one or more of the first through twelfth aspects, the grid adjustment command is included in DCI or a MAC-CE.

In a fourteenth aspect, alone or in combination with one or more of the first through thirteenth aspects, the grid adjustment command indicates a unit of adjustment and a direction of adjustment.

In a fifteenth aspect, alone or in combination with one or more of the first through fourteenth aspects, the unit of adjustment and the direction of adjustment are indicated by a two-bit grid adjustment field.

In a sixteenth aspect, alone or in combination with one or more of the first through fifteenth aspects, process 900 includes receiving, during the first time interval, another grid adjustment command, wherein the start of the second time interval is modified based at least in part on the grid adjustment command and the other adjustment command.

In a seventeenth aspect, alone or in combination with one or more of the first through sixteenth aspects, process 900 includes receiving, during the first time interval, another grid adjustment command, wherein the other grid adjustment command indicates a modification to the start of the second time interval that is the same as a modification to the start of the second time interval indicated by the grid adjustment command, and wherein the start of the second time interval is modified based at least in part on the other grid adjustment command indicating the modification to the start of the second time interval that is the same as the modification to the start of the second time interval indicated by the grid adjustment command.

In an eighteenth aspect, alone or in combination with one or more of the first through seventeenth aspects, the grid adjustment command indicates that a modification to a start of a time interval is applied to only the second time interval.

In a nineteenth aspect, alone or in combination with one or more of the first through eighteenth aspects, the modification to the start of the time interval is applied to only the second time interval to compensate for traffic jitter.

In a twentieth aspect, alone or in combination with one or more of the first through nineteenth aspects, the grid adjustment command indicates that a modification to a start of a time interval is applied to each time interval, of the respective time intervals, occurring, in time, after the first time interval.

In a twenty-first aspect, alone or in combination with one or more of the first through twentieth aspects, the modification to the start of the time interval is applied to each time interval, of the respective time intervals, occurring, in time, after the first time interval to compensate for traffic drift.

In a twenty-second aspect, alone or in combination with one or more of the first through twenty-first aspects, the configuration is associated with a first mode of PDCCH monitoring, and process 900 includes receiving an indication of a second mode of PDCCH monitoring, wherein the second mode of PDCCH monitoring is associated with skipping monitoring the PDCCH for a pre-configured duration of time, and monitoring the PDCCH during a next time interval, of the respective time intervals, based at least in part on the second mode of PDCCH monitoring.

In a twenty-third aspect, alone or in combination with one or more of the first through twenty-second aspects, the indication of the second mode of PDCCH monitoring is included in DCI or a MAC-CE.

In a twenty-fourth aspect, alone or in combination with one or more of the first through twenty-third aspects, a first field of the DCI indicates that the UE is to skip the PDCCH monitoring and a second field of the DCI indicates the second mode of PDCCH monitoring.

In a twenty-fifth aspect, alone or in combination with one or more of the first through twenty-fourth aspects, the first field of the DCI is a one bit field associated with grid-aligned PDCCH skipping and the second field of the DCI is a two bit field associated with skipping monitoring the PDCCH for the pre-configured duration of time.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
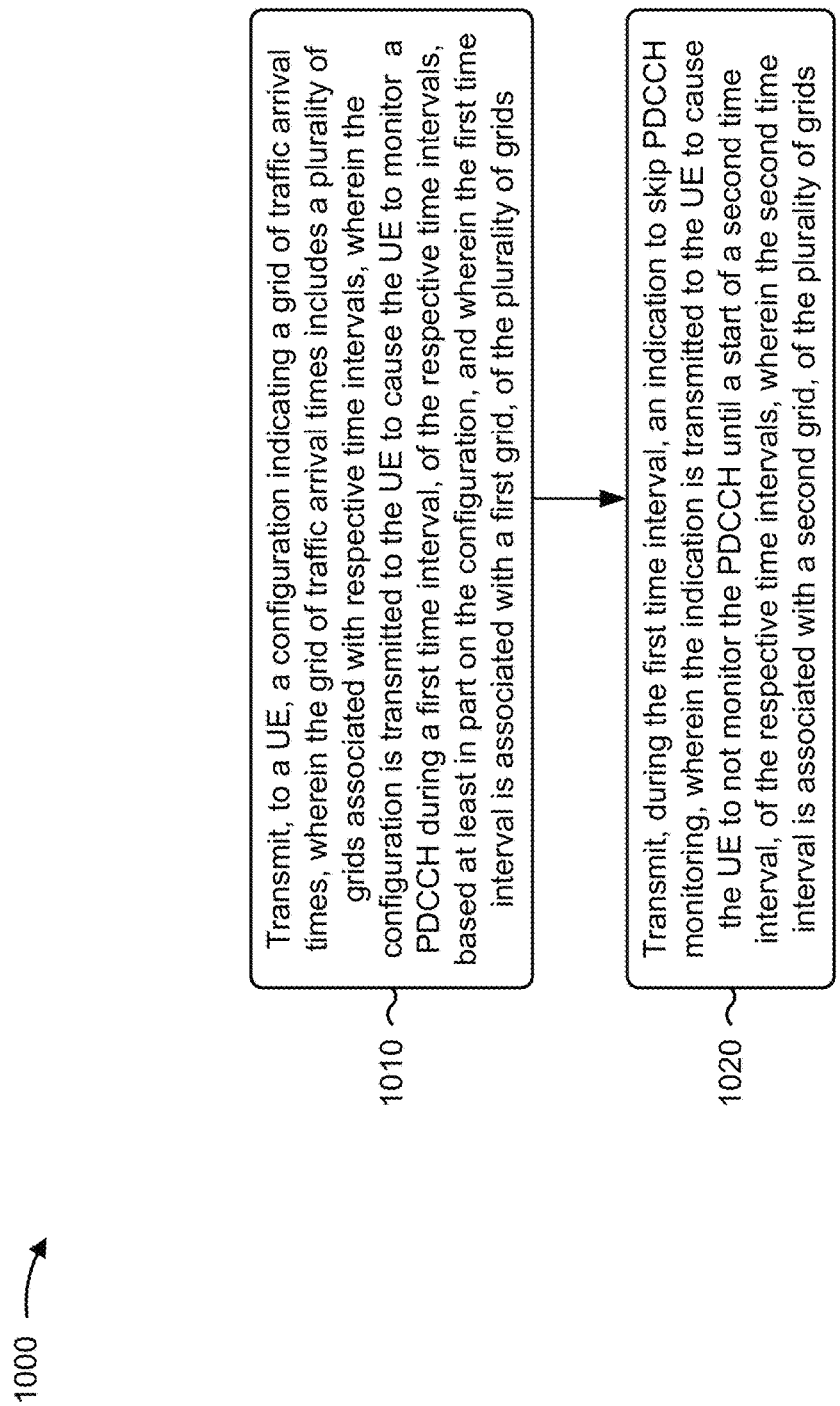

FIG. 10 is a diagram illustrating an example process 1000 performed, for example, by a base station, in accordance with the present disclosure. Example process 1000 is an example where the base station (e.g., base station 110) performs operations associated with grid-aligned PDCCH skipping for periodic traffic.

As shown in FIG. 10, in some aspects, process 1000 may include transmitting, to a UE, a configuration indicating a grid of traffic arrival times, wherein the grid of traffic arrival times includes a plurality of grids associated with respective time intervals, wherein the configuration is transmitted to the UE to cause the UE to monitor a PDCCH during a first time interval, of the respective time intervals, based at least in part on the configuration, and wherein the first time interval is associated with a first grid, of the plurality of grids (block 1010). For example, the base station (e.g., using communication manager 150 and/or transmission component 1204, depicted in FIG. 12) may transmit, to a UE, a configuration indicating a grid of traffic arrival times, wherein the grid of traffic arrival times includes a plurality of grids associated with respective time intervals, wherein the configuration is transmitted to the UE to cause the UE to monitor a PDCCH during a first time interval, of the respective time intervals, based at least in part on the configuration, and wherein the first time interval is associated with a first grid, of the plurality of grids, as described above.

As further shown in FIG. 10, in some aspects, process 1000 may include transmitting, during the first time interval, an indication to skip PDCCH monitoring, wherein the indication is transmitted to the UE to cause the UE not to monitor the PDCCH until a start of a second time interval, of the respective time intervals, wherein the second time interval is associated with a second grid, of the plurality of grids (block 1020). For example, the base station (e.g., using communication manager 150 and/or transmission component 1204, depicted in FIG. 12) may transmit, during the first time interval, an indication to skip PDCCH monitoring, wherein the indication is transmitted to the UE to cause the UE not to monitor the PDCCH until a start of a second time interval, of the respective time intervals, wherein the second time interval is associated with a second grid, of the plurality of grids, as described above.

Process 1000 may include additional aspects, such as any single aspect or any combination of aspects described below and/or in connection with one or more other processes described elsewhere herein.

In a first aspect, the configuration is associated with a traffic model for a particular type of traffic.

In a second aspect, alone or in combination with the first aspect, the particular type of traffic corresponds to video traffic, FTP traffic, AR traffic, XR traffic, or VR traffic.

In a third aspect, alone or in combination with one or more of the first and second aspects, a grid size of the plurality of grids is based at least in part on an inter-arrival time of traffic communicated via a PDSCH.

In a fourth aspect, alone or in combination with one or more of the first through third aspects, a grid size of the plurality of grids is based at least in part on one or more of a MAC parameter or a parameter associated with a PHY layer of the UE.

In a fifth aspect, alone or in combination with one or more of the first through fourth aspects, a distance between a start of the first grid and a start of the second grid, within the grid of traffic arrival times, is an integer multiple of a PDCCH monitoring periodicity.

In a sixth aspect, alone or in combination with one or more of the first through fifth aspects, a distance between a start of the first grid and a start of the second grid, within the grid of traffic arrival times, is aligned with a DRX cycle.

In a seventh aspect, alone or in combination with one or more of the first through sixth aspects, process 1000 includes transmitting, via RRC signaling, an indication of a grid size of the plurality of grids.

In an eighth aspect, alone or in combination with one or more of the first through seventh aspects, a grid size of the plurality of grids is defined in units of slots or in absolute time duration.

In a ninth aspect, alone or in combination with one or more of the first through eighth aspects, process 1000 includes receiving an indication of a grid size of the plurality of grids, and transmitting the configuration indicating the grid size based at least in part on the indication of the grid size.

In a tenth aspect, alone or in combination with one or more of the first through ninth aspects, the indication to skip the PDCCH monitoring is transmitted via DCI or a MAC-CE.

In an eleventh aspect, alone or in combination with one or more of the first through tenth aspects, the indication to skip the PDCCH monitoring is included in a one-bit field of DCI.

In a twelfth aspect, alone or in combination with one or more of the first through eleventh aspects, process 1000 includes transmitting, during the first time interval, a grid adjustment command, wherein the UE modifies the start of the second time interval based at least in part on the grid adjustment command, and wherein the PDCCH is monitored based at least in part on modifying the start of the second time interval.

In a thirteenth aspect, alone or in combination with one or more of the first through twelfth aspects, the grid adjustment command is included in DCI or a MAC-CE.

In a fourteenth aspect, alone or in combination with one or more of the first through thirteenth aspects, the grid adjustment command indicates a unit of adjustment and a direction of adjustment.

In a fifteenth aspect, alone or in combination with one or more of the first through fourteenth aspects, the unit of adjustment and the direction of adjustment are indicated by a two-bit grid adjustment field.

In a sixteenth aspect, alone or in combination with one or more of the first through fifteenth aspects, process 1000 includes transmitting, during the first time interval, another grid adjustment command, wherein the start of the second time interval is modified based at least in part on the grid adjustment command and the other adjustment command.

In a seventeenth aspect, alone or in combination with one or more of the first through sixteenth aspects, process 1000 includes transmitting, during the first time interval, another grid adjustment command, wherein the other grid adjustment command indicates a modification to the start of the second time interval that is the same as a modification to the start of the second time interval indicated by the grid adjustment command, and wherein the start of the second time interval is modified based at least in part on the other grid adjustment command indicating the modification to the start of the second time interval that is the same as the modification to the start of the second time interval indicated by the grid adjustment command.

In an eighteenth aspect, alone or in combination with one or more of the first through seventeenth aspects, the grid adjustment command indicates that a modification to a start of a time interval is applied to only the second time interval.

In a nineteenth aspect, alone or in combination with one or more of the first through eighteenth aspects, the modification to the start of the time interval is applied to only the second time interval to compensate for traffic jitter.

In a twentieth aspect, alone or in combination with one or more of the first through nineteenth aspects, the grid adjustment command indicates that a modification to a start of a time interval is applied to each time interval, of the respective time intervals, occurring, in time, after the first time interval.

In a twenty-first aspect, alone or in combination with one or more of the first through twentieth aspects, the modification to the start of the time interval is applied to each time interval, of the respective time intervals, occurring, in time, after the first time interval to compensate for traffic drift.

In a twenty-second aspect, alone or in combination with one or more of the first through twenty-first aspects, the configuration is associated with a first mode of PDCCH monitoring, and process 1000 includes transmitting an indication of a second mode of PDCCH monitoring, wherein the second mode of PDCCH monitoring is associated with skipping monitoring the PDCCH for a pre-configured duration of time, and wherein the UE monitors the PDCCH during a next time interval, of the respective time intervals, based at least in part on the second mode of PDCCH monitoring.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
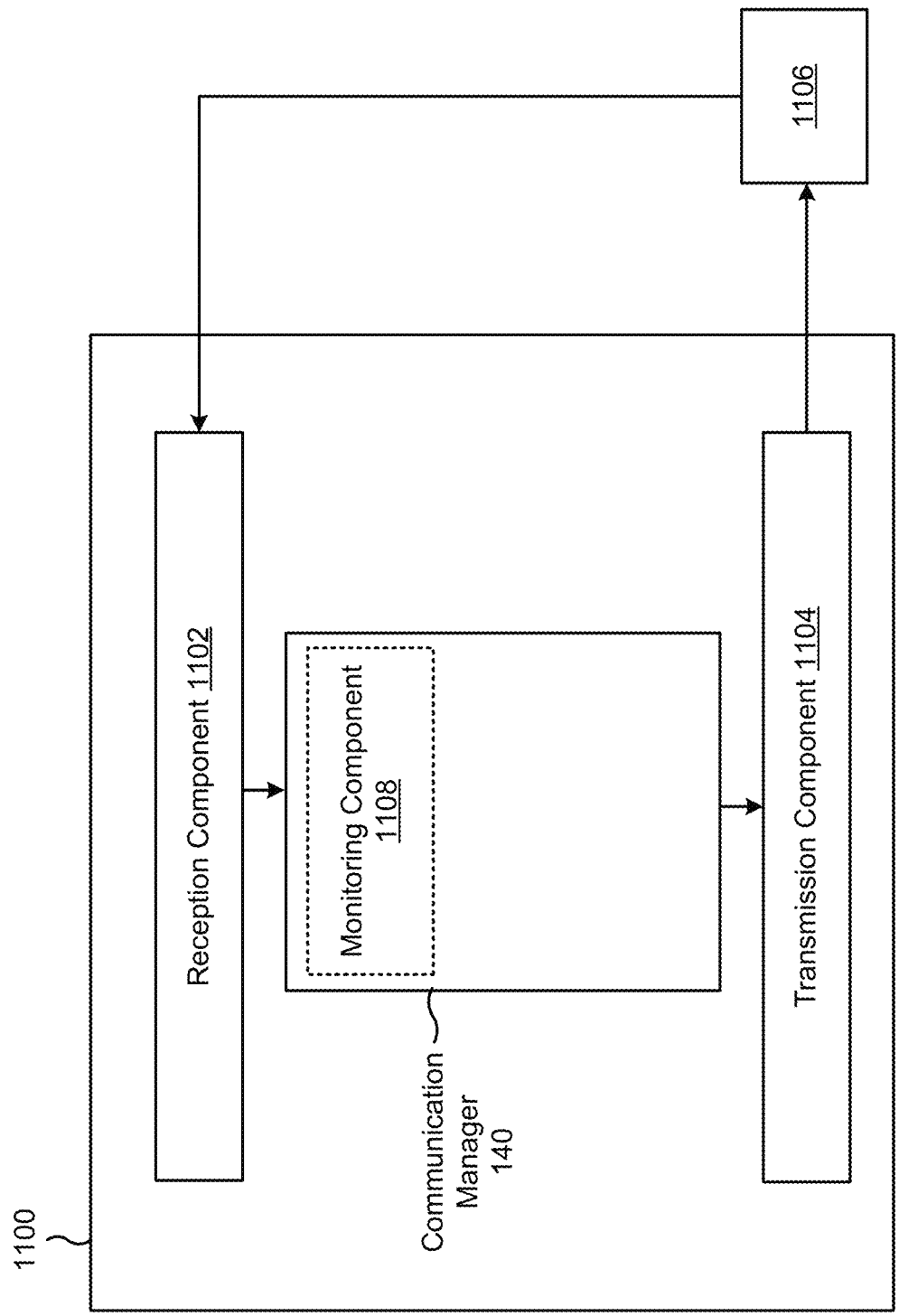
FIGS. 11 and 12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a monitoring component 1108, among other examples.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive a configuration indicating a grid of traffic arrival times, wherein the grid of traffic arrival times includes a plurality of grids associated with respective time intervals. The monitoring component 1108 may monitor a PDCCH during a first time interval, of the respective time intervals, wherein the first time interval is associated with a first grid, of the plurality of grids. The reception component 1102 may receive an indication to skip PDCCH monitoring based at least in part on monitoring the PDCCH during the first time interval. The monitoring component 1108 may monitor the PDCCH during a second time interval, of the respective time intervals, wherein the first time interval is associated with a second grid, of the plurality of grids, and wherein the UE does not monitor the PDCCH until a start of the second time interval based at least in part on the indication to skip the PDCCH monitoring.

The reception component 1102 may receive, via RRC signaling, an indication of a grid size of the plurality of grids.

The transmission component 1104 may transmit an indication of a grid size of the plurality of grids.

The reception component 1102 may receive, during the first time interval, a grid adjustment command.

The monitoring component 1108 may modify the start of the second time interval based at least in part on the grid adjustment command, wherein the PDCCH is monitored based at least in part on modifying the start of the second time interval.

The reception component 1102 may receive, during the first time interval, another grid adjustment command, wherein the start of the second time interval is modified based at least in part on the grid adjustment command and the other adjustment command.

The reception component 1102 may receive, during the first time interval, another grid adjustment command, wherein the other grid adjustment command indicates a modification to the start of the second time interval that is the same as a modification to the start of the second time interval indicated by the grid adjustment command, and wherein the start of the second time interval is modified based at least in part on the other grid adjustment command indicating the modification to the start of the second time interval that is the same as the modification to the start of the second time interval indicated by the grid adjustment command.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
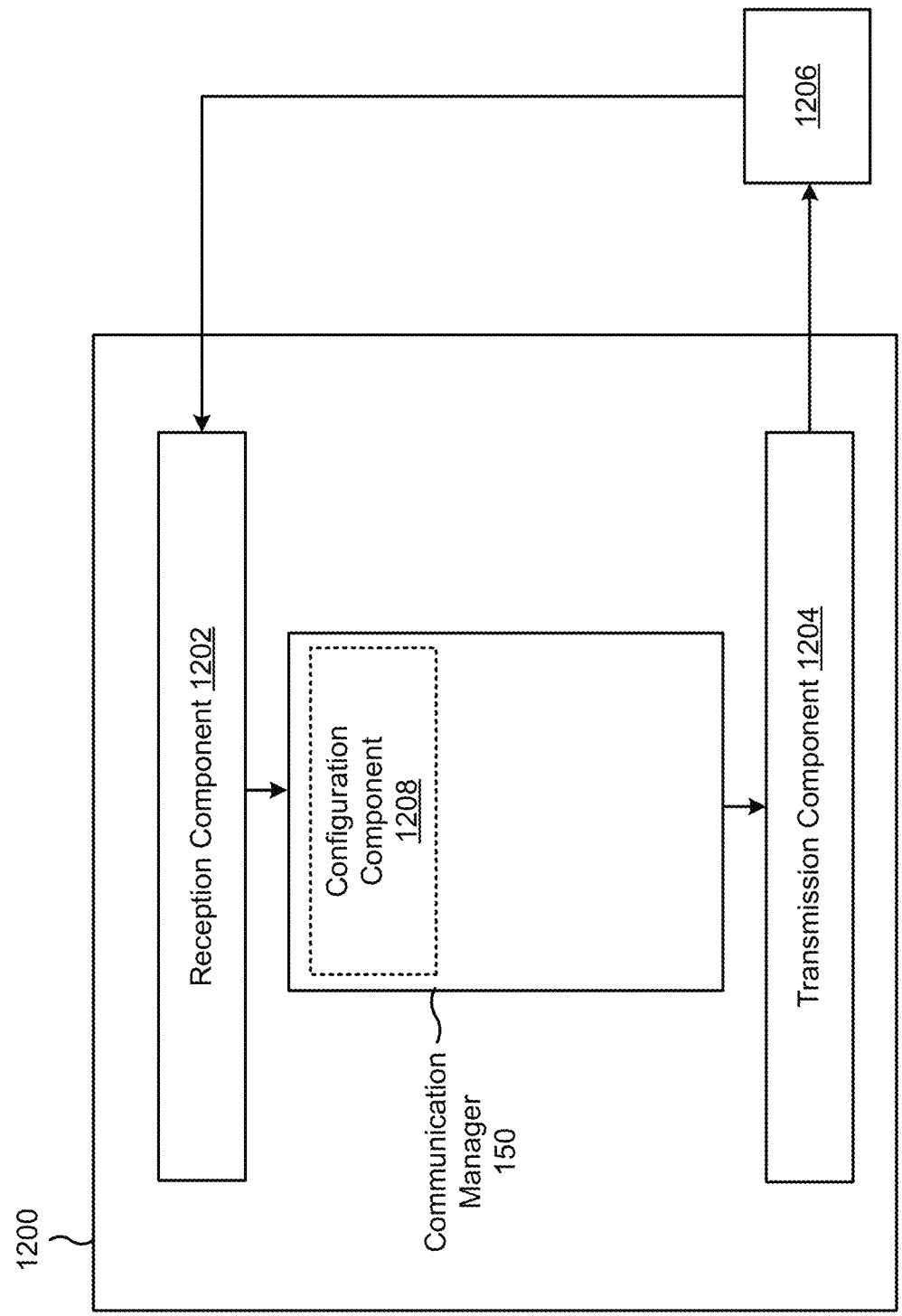

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a configuration component 1208, among other examples.

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The configuration component 1208 may generate a configuration indicating a grid of traffic arrival times, wherein the grid of traffic arrival times includes a plurality of grids associated with respective time intervals. The transmission component 1204 may transmit the configuration to the UE, wherein the UE monitors a PDCCH during a first time interval, of the respective time intervals, based at least in part on the configuration, and wherein the first time interval is associated with a first grid, of the plurality of grids. The transmission component 1204 may transmit, during the first time interval, an indication to skip PDCCH monitoring, wherein the UE monitors the PDCCH during a second time interval, of the respective time intervals, wherein the first time interval is associated with a second grid, of the plurality of grids, and wherein the UE does not monitor the PDCCH until a start of the second time interval based at least in part on the indication to skip the PDCCH monitoring.

The transmission component 1204 may transmit, via RRC signaling, an indication of a grid size of the plurality of grids.

The reception component 1202 may receive an indication of a grid size of the plurality of grids.

The transmission component 1204 may transmit the configuration indicating the grid size based at least in part on the indication of the grid size.

The transmission component 1204 may transmit, during the first time interval, a grid adjustment command, wherein the UE modifies the start of the second time interval based at least in part on the grid adjustment command, and wherein the PDCCH is monitored based at least in part on modifying the start of the second time interval.

The transmission component 1204 may transmit, during the first time interval, another grid adjustment command, wherein the start of the second time interval is modified based at least in part on the grid adjustment command and the other adjustment command.

The transmission component 1204 may transmit, during the first time interval, another grid adjustment command, wherein the other grid adjustment command indicates a modification to the start of the second time interval that is the same as a modification to the start of the second time interval indicated by the grid adjustment command; and wherein the start of the second time interval is modified based at least in part on the other grid adjustment command indicating the modification to the start of the second time interval that is the same as the modification to the start of the second time interval indicated by the grid adjustment command.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving a configuration indicating a grid of traffic arrival times, wherein the grid of traffic arrival times includes a plurality of grids associated with respective time intervals; monitoring a PDCCH during a first time interval, of the respective time intervals, wherein the first time interval is associated with a first grid, of the plurality of grids; receiving an indication to skip PDCCH monitoring based at least in part on monitoring the PDCCH during the first time interval; and monitoring the PDCCH during a second time interval, of the respective time intervals, wherein the first time interval is associated with a second grid, of the plurality of grids, and wherein the UE does not monitor the PDCCH until a start of the second time interval based at least in part on the indication to skip the PDCCH monitoring.

Aspect 2: The method of Aspect 1, wherein the configuration is associated with a traffic model for a particular type of traffic.

Aspect 3: The method of Aspect 2, wherein the particular type of traffic corresponds to video traffic, FTP traffic, AR traffic, XR traffic, or VR traffic.

Aspect 4: The method of one or more of Aspects 1 through 3, wherein a grid size of the plurality of grids is based at least in part on an inter-arrival time of traffic communicated via a PDSCH.

Aspect 5: The method of one or more of Aspects 1 through 4, wherein a grid size of the plurality of grids is based at least in part on one or more of a MAC parameter or a parameter associated with a PHY layer of the UE.

Aspect 6: The method of one or more of Aspects 1 through 5, wherein a distance between a start of the first grid and a start of the second grid, within the grid of traffic arrival times, is an integer multiple of a PDCCH monitoring periodicity.

Aspect 7: The method of one or more of Aspects 1 through 6, wherein a distance between a start of the first grid and a start of the second grid, within the grid of traffic arrival times, is aligned with a DRX cycle.

Aspect 8: The method of one or more of Aspects 1 through 7, further comprising: receiving, via RRC signaling, an indication of a grid size of the plurality of grids.

Aspect 9: The method of one or more of Aspects 1 through 8, wherein a grid size of the plurality of grids is defined in units of slots or in absolute time duration.

Aspect 10: The method of one or more of Aspects 1 through 9, further comprising: transmitting an indication of a grid size of the plurality of grids.

Aspect 11: The method of one or more of Aspects 1 through 10, wherein the indication to skip the PDCCH monitoring is received via DCI or a MAC-CE.

Aspect 12: The method of one or more of Aspects 1 through 11, wherein the indication to skip the PDCCH monitoring is included in a one-bit field of DCI.

Aspect 13: The method of one or more of Aspects 1 through 12, further comprising: receiving, during the first time interval, a grid adjustment command; and modifying the start of the second time interval based at least in part on the grid adjustment command, wherein the PDCCH is monitored based at least in part on modifying the start of the second time interval.

Aspect 14: The method of Aspect 13, wherein the grid adjustment command is included in DCI or a MAC-CE.

Aspect 15: The method of Aspect 13, wherein the grid adjustment command indicates a unit of adjustment and a direction of adjustment.

Aspect 16: The method of Aspect 15, wherein the unit of adjustment and the direction of adjustment are indicated by a two-bit grid adjustment field.

Aspect 17: The method of Aspect 13, further comprising: receiving, during the first time interval, another grid adjustment command, wherein the start of the second time interval is modified based at least in part on the grid adjustment command and the other adjustment command.

Aspect 18: The method of Aspect 13, further comprising: receiving, during the first time interval, another grid adjustment command, wherein the other grid adjustment command indicates a modification to the start of the second time interval that is the same as a modification to the start of the second time interval indicated by the grid adjustment command; and wherein the start of the second time interval is modified based at least in part on the other grid adjustment command indicating the modification to the start of the second time interval that is the same as the modification to the start of the second time interval indicated by the grid adjustment command.

Aspect 19: The method of Aspect 13, wherein the grid adjustment command indicates that a modification to a start of a time interval is applied to only the second time interval.

Aspect 20: The method of Aspect 19, wherein the modification to the start of the time interval is applied to only the second time interval to compensate for traffic jitter.

Aspect 21: The method of Aspect 13, wherein the grid adjustment command indicates that a modification to a start of a time interval is applied to each time interval, of the respective time intervals, occurring, in time, after the first time interval.

Aspect 22: The method of Aspect 21, wherein the modification to the start of the time interval is applied to each time interval, of the respective time intervals, occurring, in time, after the first time interval to compensate for traffic drift.

Aspect 23: The method of one or more of Aspects 1 through 22, wherein the configuration is associated with a first mode of PDCCH monitoring, the method further comprising: receiving an indication of a second mode of PDCCH monitoring, wherein the second mode of PDCCH monitoring is associated with skipping monitoring the PDCCH for a pre-configured duration of time; and monitoring the PDCCH during a next time interval, of the respective time intervals, based at least in part on the second mode of PDCCH monitoring.

Aspect 24: The method of Aspect 23, wherein the indication of the second mode of PDCCH monitoring is included in DCI or a MAC-CE.

Aspect 25: The method of Aspect 23, wherein a first field of DCI indicates that the UE is to skip the PDCCH monitoring and a second field of the DCI indicates the second mode of PDCCH monitoring.

Aspect 26: The method of Aspect 25, wherein the first field of the DCI is a one bit field associated with grid-aligned PDCCH skipping and the second field of the DCI is a two bit field associated with skipping monitoring the PDCCH for the pre-configured duration of time.

Aspect 27: A method of wireless communication performed by a base station, comprising: transmitting, to a UE, a configuration indicating a grid of traffic arrival times, wherein the grid of traffic arrival times includes a plurality of grids associated with respective time intervals, wherein the UE monitors a PDCCH during a first time interval, of the respective time intervals, based at least in part on the configuration, and wherein the first time interval is associated with a first grid, of the plurality of grids; and transmitting, during the first time interval, an indication to skip PDCCH monitoring, wherein the UE monitors the PDCCH during a second time interval, of the respective time intervals, wherein the first time interval is associated with a second grid, of the plurality of grids, and wherein the UE does not monitor the PDCCH until a start of the second time interval based at least in part on the indication to skip the PDCCH monitoring.

Aspect 28: The method of Aspect 27, wherein the configuration is associated with a traffic model for a particular type of traffic.

Aspect 29: The method of Aspect 28, wherein the particular type of traffic corresponds to video traffic, FTP traffic, AR traffic, XR traffic, or VR traffic.

Aspect 30: The method of one or more of Aspects 27 through 29, wherein a grid size of the plurality of grids is based at least in part on an inter-arrival time of traffic communicated via a PDSCH.

Aspect 31: The method of one or more of Aspects 27 through 30, wherein a grid size of the plurality of grids is based at least in part on one or more of a MAC parameter or a parameter associated with a PHY layer of the UE.

Aspect 32: The method of one or more of Aspects 27 through 31, wherein a distance between a start of the first grid and a start of the second grid, within the grid of traffic arrival times, is an integer multiple of a PDCCH monitoring periodicity.

Aspect 33: The method of one or more of Aspects 27 through 32, wherein a distance between a start of the first grid and a start of the second grid, within the grid of traffic arrival times, is aligned with a DRX cycle.

Aspect 34: The method of one or more of Aspects 27 through 33, further comprising: transmitting, via RRC signaling, an indication of a grid size of the plurality of grids.

Aspect 35: The method of one or more of Aspects 27 through 34, wherein a grid size of the plurality of grids is defined in units of slots or in absolute time duration.

Aspect 36: The method of one or more of Aspects 27 through 35, further comprising: receiving an indication of a grid size of the plurality of grids; and transmitting the configuration indicating the grid size based at least in part on the indication of the grid size.

Aspect 37: The method of one or more of Aspects 27 through 36, wherein the indication to skip the PDCCH monitoring is transmitted via DCI or a MAC-CE.

Aspect 38: The method of one or more of Aspects 27 through 37, wherein the indication to skip the PDCCH monitoring is included in a one-bit field of DCI.

Aspect 39: The method of one or more of Aspects 27 through 38, further comprising: transmitting, during the first time interval, a grid adjustment command, wherein the UE modifies the start of the second time interval based at least in part on the grid adjustment command, and wherein the PDCCH is monitored based at least in part on modifying the start of the second time interval.

Aspect 40: The method of Aspect 39, wherein the grid adjustment command is included in DCI or a MAC-CE.

Aspect 41: The method of Aspect 39, wherein the grid adjustment command indicates a unit of adjustment and a direction of adjustment.

Aspect 42: The method of Aspect 41, wherein the unit of adjustment and the direction of adjustment are indicated by a two-bit grid adjustment field.

Aspect 43: The method of Aspect 39, further comprising: transmitting, during the first time interval, another grid adjustment command, wherein the start of the second time interval is modified based at least in part on the grid adjustment command and the other adjustment command.

Aspect 44: The method of Aspect 39, further comprising: transmitting, during the first time interval, another grid adjustment command, wherein the other grid adjustment command indicates a modification to the start of the second time interval that is the same as a modification to the start of the second time interval indicated by the grid adjustment command; and wherein the start of the second time interval is modified based at least in part on the other grid adjustment command indicating the modification to the start of the second time interval that is the same as the modification to the start of the second time interval indicated by the grid adjustment command.

Aspect 45: The method of Aspect 39, wherein the grid adjustment command indicates that a modification to a start of a time interval is applied to only the second time interval.

Aspect 46: The method of Aspect 45, wherein the modification to the start of the time interval is applied to only the second time interval to compensate for traffic jitter.

Aspect 47: The method of Aspect 39, wherein the grid adjustment command indicates that a modification to a start of a time interval is applied to each time interval, of the respective time intervals, occurring, in time, after the first time interval.

Aspect 48: The method of Aspect 47, wherein the modification to the start of the time interval is applied to each time interval, of the respective time intervals, occurring, in time, after the first time interval to compensate for traffic drift.

Aspect 49: The method of one or more of Aspects 27 through 48, wherein the configuration is associated with a first mode of PDCCH monitoring, the method further comprising: transmitting an indication of a second mode of PDCCH monitoring, wherein the second mode of PDCCH monitoring is associated with skipping monitoring the PDCCH for a pre-configured duration of time, and wherein the UE monitors the PDCCH during a next time interval, of the respective time intervals, based at least in part on the second mode of PDCCH monitoring.

Aspect 50: An apparatus for wireless communication at a device, comprising a processor; memory coupled with the processor; and instructions stored in the memory and executable by the processor to cause the apparatus to perform the method of one or more of Aspects 1 through 26.

Aspect 51: A device for wireless communication, comprising a memory and one or more processors coupled to the memory, the one or more processors configured to perform the method of one or more of Aspects 1 through 26.

Aspect 52: An apparatus for wireless communication, comprising at least one means for performing the method of one or more of Aspects 1 through 26.

Aspect 53: A non-transitory computer-readable medium storing code for wireless communication, the code comprising instructions executable by a processor to perform the method of one or more of Aspects 1 through 26.

Aspect 54: A non-transitory computer-readable medium storing a set of instructions for wireless communication, the set of instructions comprising one or more instructions that, when executed by one or more processors of a device, cause the device to perform the method of one or more of Aspects 1 through 26.

Aspect 55: An apparatus for wireless communication at a device, comprising a processor; memory coupled with the processor; and instructions stored in the memory and executable by the processor to cause the apparatus to perform the method of one or more of Aspects 27 through 49.

Aspect 56: A device for wireless communication, comprising a memory and one or more processors coupled to the memory, the one or more processors configured to perform the method of one or more of Aspects 27 through 49.

Aspect 57: An apparatus for wireless communication, comprising at least one means for performing the method of one or more of Aspects 27 through 49.

Aspect 58: A non-transitory computer-readable medium storing code for wireless communication, the code comprising instructions executable by a processor to perform the method of one or more of Aspects 27 through 49.

Aspect 59: A non-transitory computer-readable medium storing a set of instructions for wireless communication, the set of instructions comprising one or more instructions that, when executed by one or more processors of a device, cause the device to perform the method of one or more of Aspects 27 through 49.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive a configuration indicating a grid of traffic arrival times, wherein the grid of traffic arrival times includes a plurality of grids associated with respective time intervals;
monitor a physical downlink control channel (PDCCH) during a first time interval, of the respective time intervals, wherein the first time interval is associated with a first grid, of the plurality of grids;
receive an indication to skip PDCCH monitoring based at least in part on monitoring the PDCCH during the first time interval; and
monitor the PDCCH during a second time interval, of the respective time intervals, wherein the second time interval is associated with a second grid, of the plurality of grids, and wherein the PDCCH is not monitored until a start of the second time interval based at least in part on the indication to skip the PDCCH monitoring.

2. The UE of claim 1, wherein the configuration is associated with a traffic model for a particular type of traffic.

3. The UE of claim 2, wherein the particular type of traffic corresponds to video traffic, file transfer protocol (FTP) traffic, augmented reality (AR) traffic, extended reality (XR) traffic, or virtual reality (VR) traffic.

4. The UE of claim 1, wherein a grid size of the plurality of grids is based at least in part on an inter-arrival time of traffic communicated via a physical downlink shared channel (PDSCH).

5. The UE of claim 1, wherein a grid size of the plurality of grids is based at least in part on one or more of a media access control (MAC) parameter or a parameter associated with a physical (PHY) layer of the UE.

6. The UE of claim 1, wherein a distance between a start of the first grid and a start of the second grid, within the grid of traffic arrival times, is an integer multiple of a PDCCH monitoring periodicity.

7. The UE of claim 1, wherein a distance between a start of the first grid and a start of the second grid, within the grid of traffic arrival times, is aligned with a discontinuous reception (DRX) cycle.

8. The UE of claim 1, wherein the one or more processors are further configured to:
receive, via radio resource control (RRC) signaling, an indication of a grid size of the plurality of grids.

9. The UE of claim 1, wherein a grid size of the plurality of grids is defined in units of slots or in absolute time duration.

10. The UE of claim 1, wherein the one or more processors are further configured to:
transmit an indication of a grid size of the plurality of grids.

11. The UE of claim 1, wherein the indication to skip the PDCCH monitoring is received via downlink control information (DCI) or a media access control-control element (MAC-CE).

12. The UE of claim 1, wherein the indication to skip the PDCCH monitoring is included in a one-bit field of downlink control information (DCI).

13. The UE of claim 1, wherein the one or more processors are further configured to:
receive, during the first time interval, a grid adjustment command; and
modify the start of the second time interval based at least in part on the grid adjustment command, wherein the PDCCH is monitored based at least in part on modifying the start of the second time interval.

14. The UE of claim 13, wherein the grid adjustment command is included in downlink control information (DCI) or a media access control-control element (MAC-CE).

15. The UE of claim 13, wherein the grid adjustment command indicates a unit of adjustment and a direction of adjustment.

16. The UE of claim 15, wherein the unit of adjustment and the direction of adjustment are indicated by a two-bit grid adjustment field.

17. The UE of claim 13, wherein the one or more processors are further configured to:
receive, during the first time interval, another grid adjustment command, wherein the start of the second time interval is modified based at least in part on the grid adjustment command and the other adjustment command.

18. The UE of claim 13, wherein the one or more processors are further configured to:
receive, during the first time interval, another grid adjustment command, wherein the other grid adjustment command indicates a modification to the start of the second time interval that is the same as a modification to the start of the second time interval indicated by the grid adjustment command; and wherein the start of the second time interval is modified based at least in part on the other grid adjustment command indicating the modification to the start of the second time interval that is the same as the modification to the start of the second time interval indicated by the grid adjustment command.

19. The UE of claim 13, wherein the grid adjustment command indicates that a modification to a start of a time interval is applied to only the second time interval.

20. The UE of claim 19, wherein the modification to the start of the time interval is applied to only the second time interval to compensate for traffic jitter.

21. The UE of claim 13, wherein the grid adjustment command indicates that a modification to a start of a time interval is applied to each time interval, of the respective time intervals, occurring, in time, after the first time interval.

22. The UE of claim 21, wherein the modification to the start of the time interval is applied to each time interval, of the respective time intervals, occurring, in time, after the first time interval to compensate for traffic drift.

23. The UE of claim 1, wherein the configuration is associated with a first mode of PDCCH monitoring, and wherein the one or more processors are further configured to:
receive an indication of a second mode of PDCCH monitoring, wherein the second mode of PDCCH monitoring is associated with skipping monitoring the PDCCH for a pre-configured duration of time; and
monitor the PDCCH during a next time interval, of the respective time intervals, based at least in part on the second mode of PDCCH monitoring.

24. The UE of claim 23, wherein the indication of the second mode of PDCCH monitoring is included in downlink control information (DCI) or a media access control-control element (MAC-CE).

25. The UE of claim 23, wherein a first field of downlink control information (DCI) indicates that the UE is to skip the PDCCH monitoring and a second field of the DCI indicates the second mode of PDCCH monitoring.

26. The UE of claim 25, wherein the first field of the DCI is a one bit field associated with grid-aligned PDCCH skipping and the second field of the DCI is a two bit field associated with skipping monitoring the PDCCH for the pre-configured duration of time.

27. A base station for wireless communication, comprising:
   a memory; and
   one or more processors, coupled to the memory, configured to:
      transmit, to a user equipment (UE), a configuration indicating a grid of traffic arrival times, wherein the grid of traffic arrival times includes a plurality of grids associated with respective time intervals, wherein the UE monitors a physical downlink control channel (PDCCH) during a first time interval, of the respective time intervals, based at least in part on the configuration, and wherein the first time interval is associated with a first grid, of the plurality of grids; and
      transmit, during the first time interval, an indication to skip PDCCH monitoring, wherein the indication is transmitted to the UE to cause the UE not to monitor the PDCCH until a start of a second time interval, of the respective time intervals, wherein the second time interval is associated with a second grid, of the plurality of grids.

28. The base station of claim 27, wherein the configuration is associated with a traffic model for a particular type of traffic.

29. The base station of claim 28, wherein the particular type of traffic corresponds to video traffic, file transfer protocol (FTP) traffic, augmented reality (AR) traffic, extended reality (XR) traffic, or virtual reality (VR) traffic.

30. The base station of claim 27, wherein a grid size of the plurality of grids is based at least in part on an inter-arrival time of traffic communicated via a physical downlink shared channel (PDSCH).

* * * * *